US011255371B2

(12) United States Patent
Dubberly et al.

(10) Patent No.: US 11,255,371 B2
(45) Date of Patent: Feb. 22, 2022

(54) RIVETLESS FASTENER AND INSTALLATION TOOL

(71) Applicant: Partworks, LLC, Atlanta, GA (US)

(72) Inventors: Mike J. Dubberly, Manassas, VA (US); Corey A. Ragsdale, Acworth, GA (US)

(73) Assignee: Partworks, LLC, Atlanta, GA (US)

( * ) Notice: Subject to any disclaimer, the term of this patent is extended or adjusted under 35 U.S.C. 154(b) by 515 days.

(21) Appl. No.: 16/138,253

(22) Filed: Sep. 21, 2018

(65) Prior Publication Data

US 2019/0093700 A1    Mar. 28, 2019

Related U.S. Application Data

(60) Provisional application No. 62/673,502, filed on May 18, 2018, provisional application No. 62/643,636, (Continued)

(51) Int. Cl.
*F16B 39/284* (2006.01)
*F16B 43/00* (2006.01)
(Continued)

(52) U.S. Cl.
CPC .......... *F16B 43/005* (2013.01); *F16B 37/044* (2013.01); *F16B 37/048* (2013.01); (Continued)

(58) Field of Classification Search
CPC .................................................. F16B 43/005
(Continued)

(56) References Cited

U.S. PATENT DOCUMENTS 1,523,788 A * 1/1925 Oliver .................... B65H 75/14
                                                    242/118.61
1,781,801 A * 11/1930 Baldwin ................ B65H 75/14
                                                    242/118.61
(Continued)

FOREIGN PATENT DOCUMENTS

WO    2019060725 A1    3/2019

OTHER PUBLICATIONS

PCT International Search Report and Written Opinion in International Patent Application No. PCT/US2018/052220, dated Feb. 25, 2019.

*Primary Examiner* — Gary W Estremsky
(74) *Attorney, Agent, or Firm* — Greenberg Traurig, LLP; Todd C. Basile; David J. Dykeman

(57) ABSTRACT

A fastener for retaining a bolt in a hole in a structure, comprising a bushing integrally formed with and extending from the bottom surface of a retainer, the bushing being dimensioned for insertion into the hole in the structure and having a wall thickness ranging from about 0.005 inches to about 0.030 inches, wherein the bushing is configured to be expanded within the hole, thereby securely coupling the expanded bushing within the hole of the structure and anchoring the retainer to the surface of the structure surrounding the hole. A tool for installing a fastener, comprising a tapered mandrel configured for insertion within a fastener situated within a hole of the structure, a drive mechanism configured to retract the mandrel through the fastener and thereby expand the fastener, and a force sensor configured for measuring a force applied by the drive mechanism to retract the mandrel through the fastener.

37 Claims, 30 Drawing Sheets

Related U.S. Application Data filed on Mar. 15, 2018, provisional application No. 62/562,003, filed on Sep. 22, 2017.

(51) Int. Cl.
*F16B 37/06* (2006.01)
*F16B 37/04* (2006.01)
*F16B 21/18* (2006.01)
*F16B 11/00* (2006.01)

(52) U.S. Cl.
CPC ............ *F16B 37/065* (2013.01); *F16B 11/008* (2013.01); *F16B 21/186* (2013.01)

(58) Field of Classification Search
USPC .......................................................... 411/112
See application file for complete search history.

(56) References Cited

U.S. PATENT DOCUMENTS

| | | | |
|---|---|---|---|
| 3,179,143 A | 4/1965 | Schultz et al. | |
| 3,626,745 A | 12/1971 | Richardson et al. | |
| 3,875,649 A * | 4/1975 | King, Jr. | B23P 9/025 29/418 |
| 4,724,284 A * | 2/1988 | Wheeler | B29C 65/66 156/294 |
| 5,163,796 A | 11/1992 | Besler | |
| 5,222,399 A | 6/1993 | Kropp | |
| 5,380,136 A * | 1/1995 | Copple | F16B 37/044 411/104 |
| 5,526,669 A | 6/1996 | Gjovik et al. | |
| 5,615,575 A | 4/1997 | Goodwin | |
| 5,704,747 A * | 1/1998 | Hutter, III | F16B 37/044 411/113 |
| 6,361,239 B1 | 3/2002 | Parikh et al. | |
| 7,059,816 B2 * | 6/2006 | Toosky | B23P 9/025 411/108 |
| 7,516,234 B2 * | 4/2009 | Schoenblum | H04L 12/2801 709/231 |
| 7,516,534 B2 * | 4/2009 | Easterbrook | B21J 15/02 29/509 |
| 8,312,606 B2 * | 11/2012 | Reid | F16B 19/05 29/263 |
| 8,506,222 B2 * | 8/2013 | Reid | F16B 37/044 411/111 |
| 8,647,035 B2 * | 2/2014 | Bakken | F16B 37/064 411/112 |
| 8,938,886 B2 | 1/2015 | Ross et al. | |
| 9,199,437 B2 * | 12/2015 | Soriano | F16B 41/002 |
| 9,644,657 B2 | 5/2017 | Pham | |
| 9,719,547 B2 * | 8/2017 | Wilkerson | F16B 33/002 |
| 10,130,985 B2 | 11/2018 | Ross et al. | |
| 2003/0091408 A1 | 5/2003 | Toosky | |
| 2003/0108398 A1 | 6/2003 | Sathianathan | |
| 2007/0175010 A1 | 8/2007 | Wang et al. | |
| 2008/0168816 A1 | 7/2008 | Chitty et al. | |
| 2010/0260572 A1 * | 10/2010 | Wehrmeister | F16B 4/004 411/43 |
| 2012/0317787 A1 | 12/2012 | Ross et al. | |
| 2013/0192331 A1 | 8/2013 | Ross et al. | |
| 2013/0204422 A1 | 8/2013 | Ross et al. | |
| 2014/0130910 A1 * | 5/2014 | Alvarado, Jr. | F16B 4/004 137/560 |
| 2016/0365180 A1 * | 12/2016 | Kurtlucan | H01B 17/30 |
| 2017/0080479 A1 | 3/2017 | Harman et al. | |

* cited by examiner

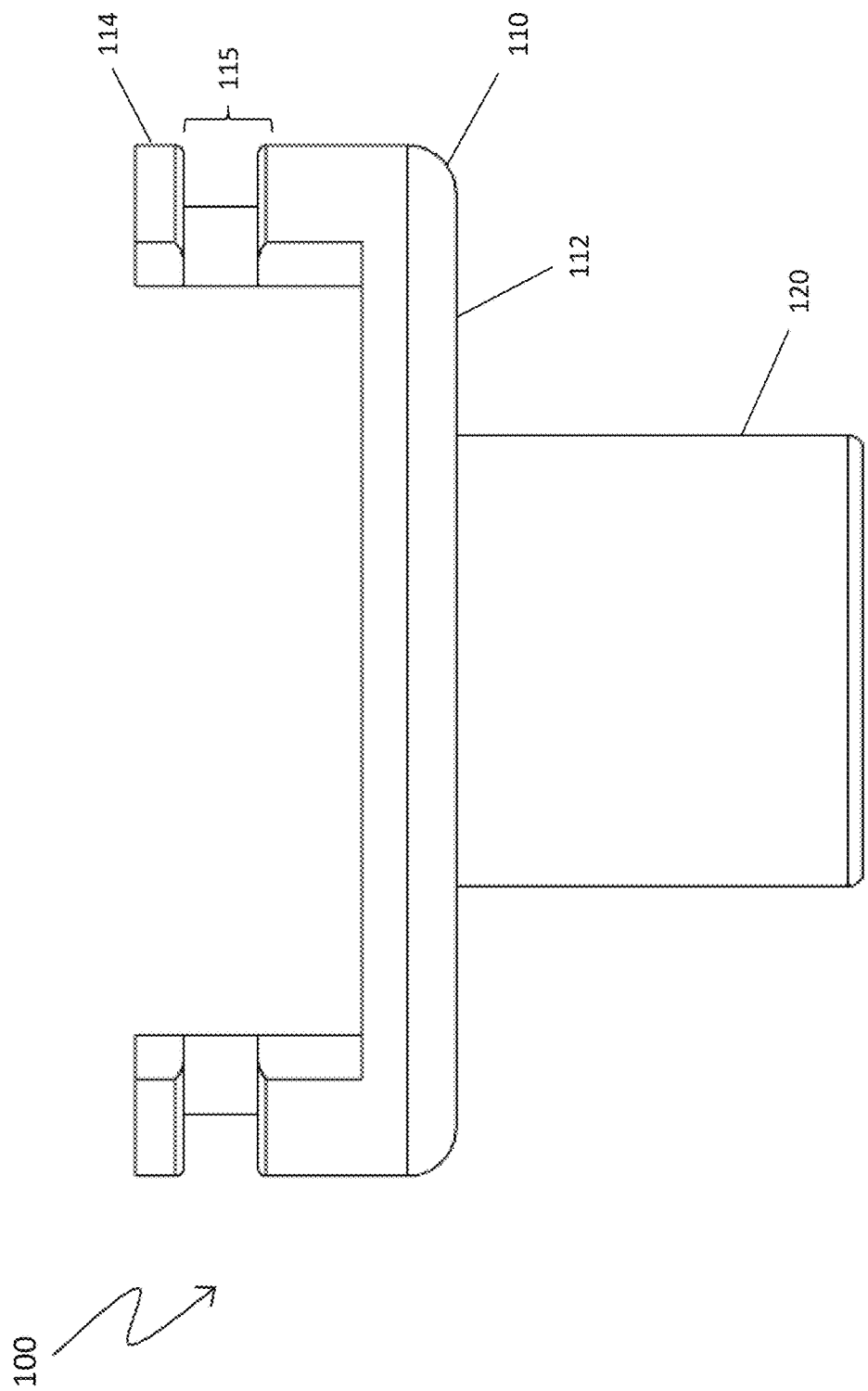

| Type | # Pieces | Barrel/sleeve thickness & material | Coldworking Benefits | Disadvantages | Installation Process | Mfg Process |
|---|---|---|---|---|---|---|
| Retainer 110 | 1 | 0.005"-.030+" 17-4 SS, Ti, SS alloys like Custom 465 | Yes, approximately 3.5% expansion. | -- | Can use existing cold working tooling. Adhesive in hole 20 and bottom of retainer 110 | Machined |
| Bonded nut plate - bonded to surface of substrate only | 1 | N/A no barrel or sleeve. AL, SS304 Low cost, not important | No | Fall off, Spin-out. Not applicable for repair since no coldworking | Adhesives require extensive surface prep. No adhesive in hole. | Stamped |
| Bonded nut plate with multi part barrel/sleeve coldworked | 2 | 0.008" SS286 AL coated SS | Yes, ranges from 3.5%-5% expansion | Fall off, spin out. Barrel is friction fit (weakly) in hole but is not fixedly attached to nut plate so does not help anchor nut plate. | Disposable mandrel adds cost. Proprietary tool. No adhesive in hole. | Stamped. Cannot do 1 piece design without machining. |
| Riveted nut plate + cold worked unbonded | 1 | .040-.065+" Titanium, 17-4 SS | Yes | Cannot be used in situations where e/D <2 (F35, F18 repair) | Same for 40 years+ No adhesive. | Machined |

FIG. 5

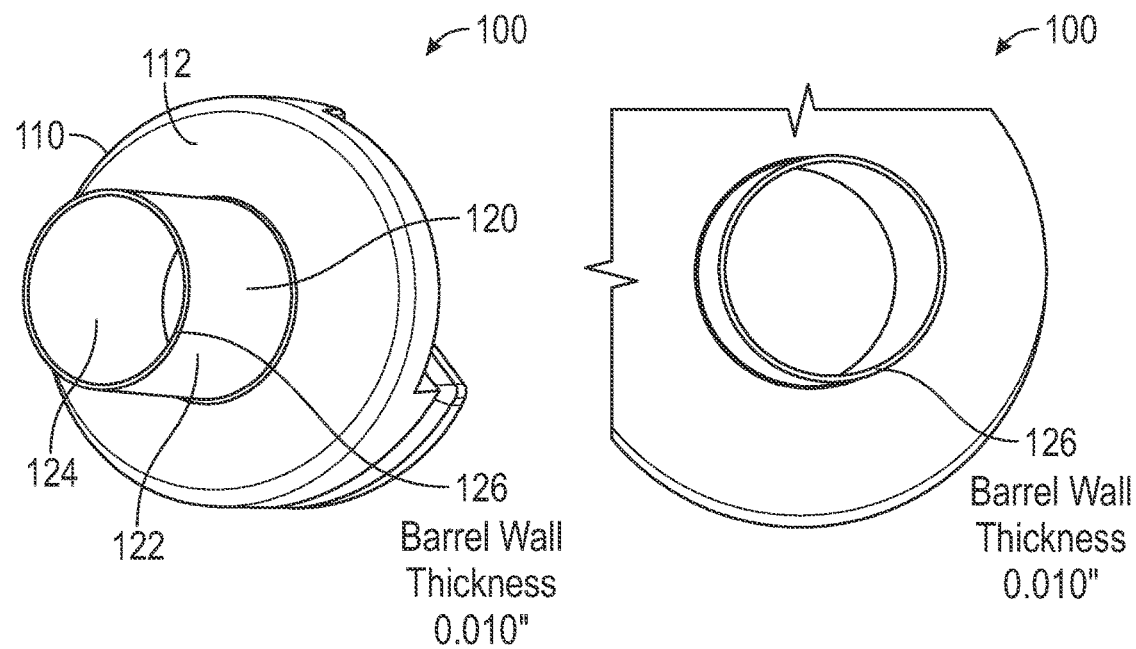
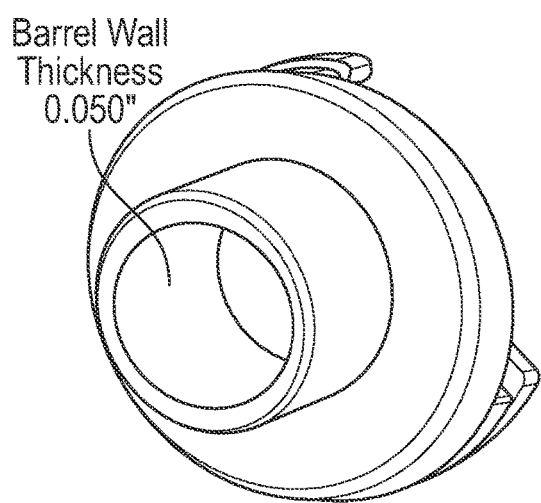
FIG. 6A
(Prior Art)
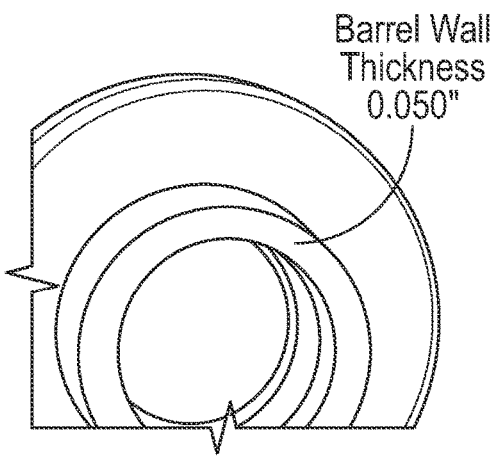
FIG. 6B
(Prior Art)

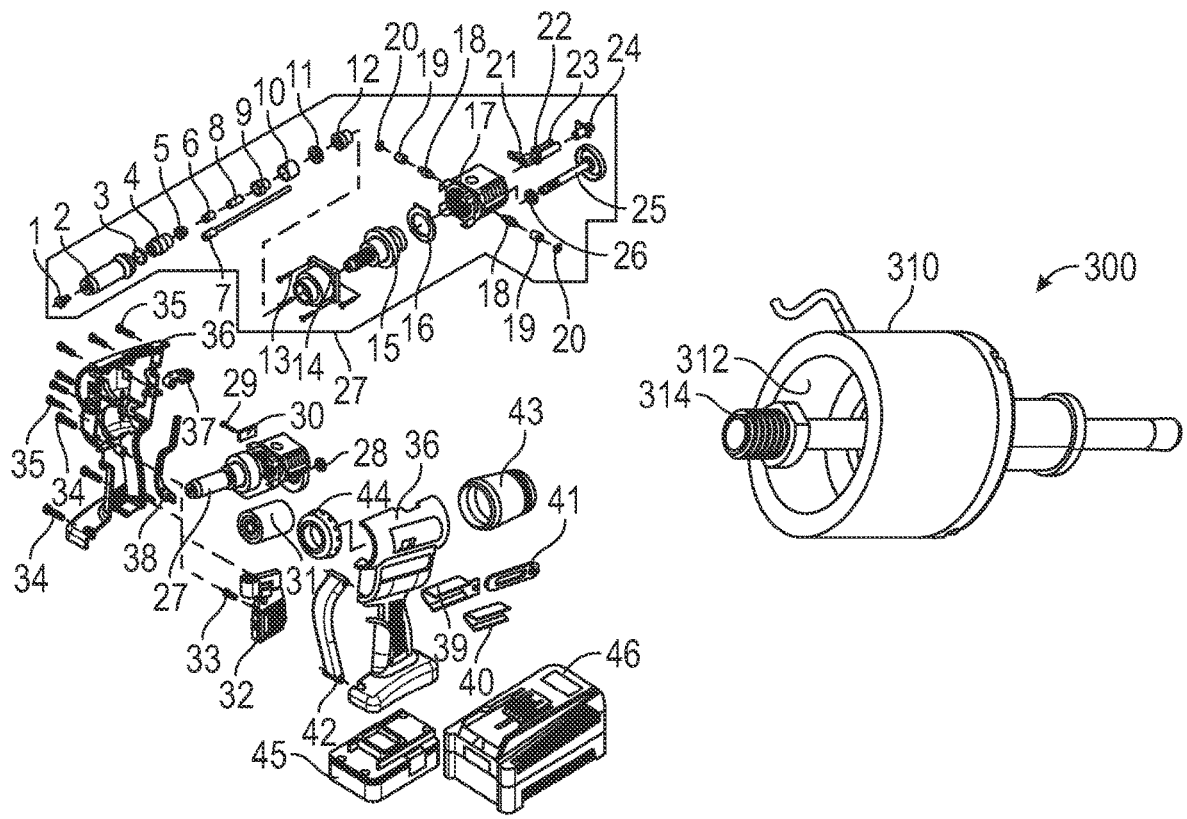
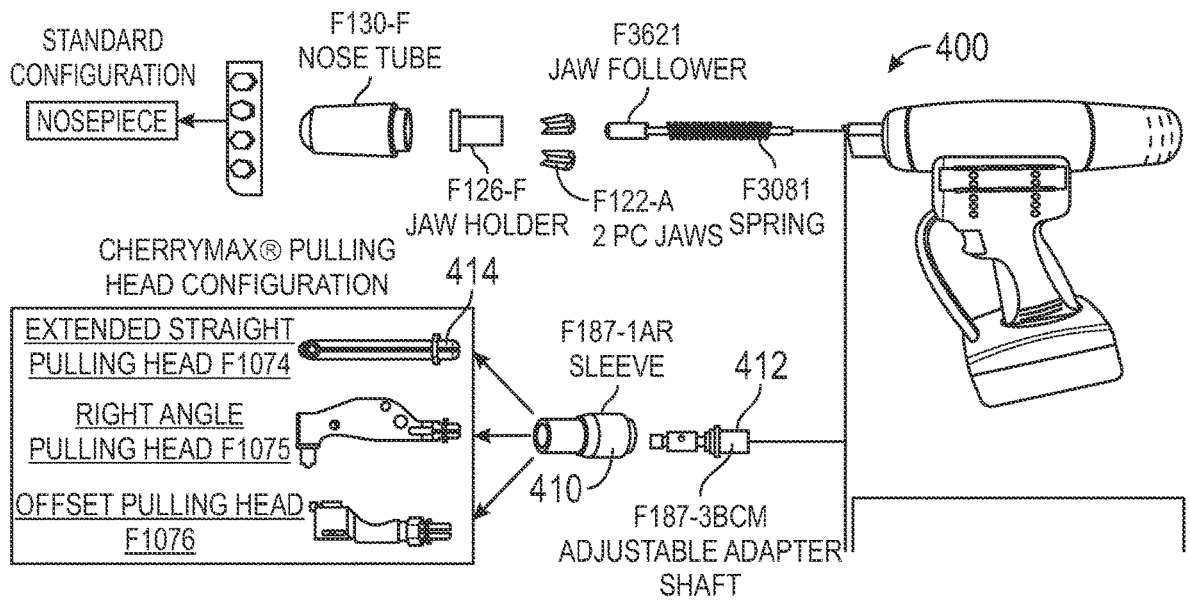
FIG. 14C

RIVETLESS FASTENER AND INSTALLATION TOOL

RELATED APPLICATIONS

This application claims priority to and the benefit of U.S. Provisional Patent Application No. 62/562,003, filed Sep. 22, 2017, U.S. Provisional Patent Application No. 62/643,636, filed Mar. 15, 2018, and U.S. Provisional Patent Application No. 62/673,502, filed May 18, 2018, each of which are hereby incorporated by reference in their entireties.

FIELD

A rivetless fastener and installation tools are disclosed, and more particularly, a rivetless fastener having a thin-walled bushing and an installation tool configured for measuring forces when installing a fastener in a structure.

BACKGROUND

Existing nut plates and similar fasteners suffer from several disadvantages. For example, some nut plates attach only to the surface of a structure via adhesive only, resulting in relatively weak attachment and a corresponding tendency to come loose and fall of the structure. Further, any cold-working of a bolt hole in the structure must be done separately from the installation of such nut plates, thereby increasing labor and cost. Other nut plates include a barrel that extends and is expanded within a bolt hole in the structure; however, the thick barrel walls require increased hole diameters, which can reduce edge distance of the hole and reduce lifespan of the structure. Further nut plates have multi-piece constructions including a sleeve that does not play a role in anchoring these nut plates to the hole in the structure, and these nut plates suffer from low torque out thresholds and other disadvantages. Further, the growing use of composite substructure in airframes is creating the need for a better solution for fastening systems, particularly for blind portions of major assemblies. The use of the traditional riveted nut plate retainer is problematic due to the cost of drilling holes in composites, particularly the small holes required for nut plate rivets. Currently other options are limited and include surface bonded retainers, which have a well-deserved reputation for falling off, and expanded retainers that depend on friction for retention while limited to very low expansion levels. Thus, there is a need for improved fasteners.

SUMMARY

The present disclosure is directed to a fastener for retaining a bolt in a hole in a structure. The fastener, in various embodiments, may comprise a retainer having a bottom surface for positioning against a surface of the structure surrounding the hole, and a bushing integrally formed with and extending from the bottom surface of the retainer, the bushing being dimensioned for insertion into the hole in the structure and having a wall thickness ranging from about 0.005 inches to about 0.030 inches. The bushing may be configured to be expanded within the hole, thereby securely coupling the expanded bushing within the hole of the structure and anchoring the retainer to the surface of the structure surrounding the hole.

The retainer, in various embodiments, may include a nut, or a coupler for receiving a nut, for securing the bolt. The fastener, in various embodiments, may be machined from a single piece of metallic material.

The bushing, in various embodiments, may have a substantially hollow cylindrical shape. The wall thickness of the bushing, in various embodiments, may minimize a diameter of the hole required for accommodating the bushing and the bolt inside of the hole. The bushing, in various embodiments, may be configured to be expanded by about 3.5% within the hole. Expansion of the bushing, in some embodiments, may securely couple the bushing with the hole of the structure via at least friction fit.

The fastener, in various embodiments, may further comprise an adhesive material positioned on at least one of the first side of the retainer and an outer surface of the bushing. In some embodiments, the adhesive material may be positioned on at least the outer surface of the bushing, and expansion of the bushing enhances a bond between the adhesive material and the hole. The enhanced bond between the adhesive material and the hole may act to securely couple the expanded bushing within the hole of the structure. In an embodiment, the adhesive may be pressure activated.

In another aspect, the present disclosure is directed to a tool for installing a fastener to a structure. The tool, in various embodiments, may comprise a mandrel having a tapered shape, the mandrel configured for insertion within a fastener situated within a hole of the structure, a drive mechanism configured to retract the mandrel through the fastener and thereby expand the fastener within the hole of the structure, and a force sensor configured for measuring a force applied by the drive mechanism to retract the mandrel through the fastener.

The drive mechanism, in various embodiments, may include a lead screw coupled with a threaded sleeve. Rotating the lead screw may cause the threaded sleeve to move axially to retract and extend the mandrel. In an embodiment, a head of the lead screw may be configured to couple with at least one of an electric drill and an impact driver. In another embodiment, the tool may include an integrated drive device for driving the drive mechanism.

The tool, in various embodiments, may further comprise a free-floating component situated adjacent to the force sensor and partially extending from a distal end of a housing of the tool. The free-floating component may be configured to transmit, to the force sensor, a pressure generated between the free-floating component and the structure when the mandrel is retracted to expand the fastener. The tool, in various embodiment, may further comprise a first pressure plate and a second pressure plate situated on opposing sides of the force sensor, the first pressure plate and the second pressure plate acting to evenly distribute and direct forces applied by the free-floating component to act perpendicular to the force sensor.

The tool, in various embodiments, may further comprise a processor configured to determine at least one of a maximum force applied during installation of the fastener and a total force applied throughout the installation of the fastener. The processor, in an embodiment, may be configured to store, or transmit for remote storage, at least one of the maximum force and the total force. The processor, in an embodiment, may be further configured to compare at least one of the measured maximum force and the measured total force to a predetermined range of corresponding forces, the predetermined range defining a range of forces indicative of a successful installation, and automatically provide a notification to a user of the tool indicating whether the measured force is within the predetermined range.

The tool, in various embodiments, may further comprise a radio frequency identification (RFID) reader positioned near a distal end of the tool. The RFID reader may be configured to automatically scan an RFID tag located on or in the fastener, and the processor may be configured to associate at least one of the maximum force and the total force with an identification of the RFID tag.

In yet another aspect, the present disclosure is directed to a tool for measuring a force associated with installation of a fastener in a structure. The tool, in various embodiments, may comprise a housing adapter shaped and dimensioned for coupling to a nosepiece of a mandrel pulling tool, a mandrel having a tapered shape, the mandrel having a proximal end configured for coupling to the mandrel pulling tool and a distal portion configured for insertion within a fastener situated within a hole of the structure, and a force sensor configured for automatically measuring a force applied by the drive mechanism to retract the mandrel through the fastener during installation.

The tool, in various embodiments, may further comprise a free-floating component situated adjacent to the force sensor and partially extending from a distal end of the housing adapter. The free-floating component may be configured to transmit, to the force sensor, a pressure generated between the free-floating component and the structure when the mandrel is retracted to expand the fastener. The tool, in various embodiments, may further comprise a first pressure plate and a second pressure plate situated on opposing sides of the force sensor, the first pressure plate and second pressure plate acting to evenly distribute and direct forces applied by the free-floating component to act perpendicular to the force sensor.

The tool, in various embodiments, may further comprise a processor configured to determine at least one of a maximum force applied during installation of the fastener and a total force applied throughout the installation of the fastener. The processor may be configured to store, or transmit for remote storage, at least one of the maximum force and the total force. The processor, in an embodiment, may be further configured to compare at least one of the measured maximum force and the measured total force to a predetermined range of corresponding forces, the predetermined range defining a range of forces indicative of a successful installation, and automatically provide a notification to a user of the tool indicating whether the measured force is within the predetermined range.

The tool, in various embodiments, may further comprise a radio frequency identification (RFID) reader positioned near a distal end of the tool. The RFID reader may be configured to automatically scan an RFID tag located on or in the fastener, and the processor may be configured to associate at least one of the maximum force and the total force with an identification of the RFID tag.

BRIEF DESCRIPTION OF THE DRAWINGS

FIG. 2A, FIG. 2B, FIG. 2C, and FIG. 2D illustrate front, side, top, and bottom views of fastener 100;

FIG. 5 is a chart comparing aspects of fastener 100 of the present disclosure with those of existing nut plates;

FIG. 6A and FIG. 6B depict the representative embodiments of fastener 100 and a thick-walled nut plate;

FIG. 14A, FIG. 14B and FIG. 14C illustrate schematic views of adapter 300 configured for use with various existing pullers 400;

DETAILED DESCRIPTION

Figure 1:
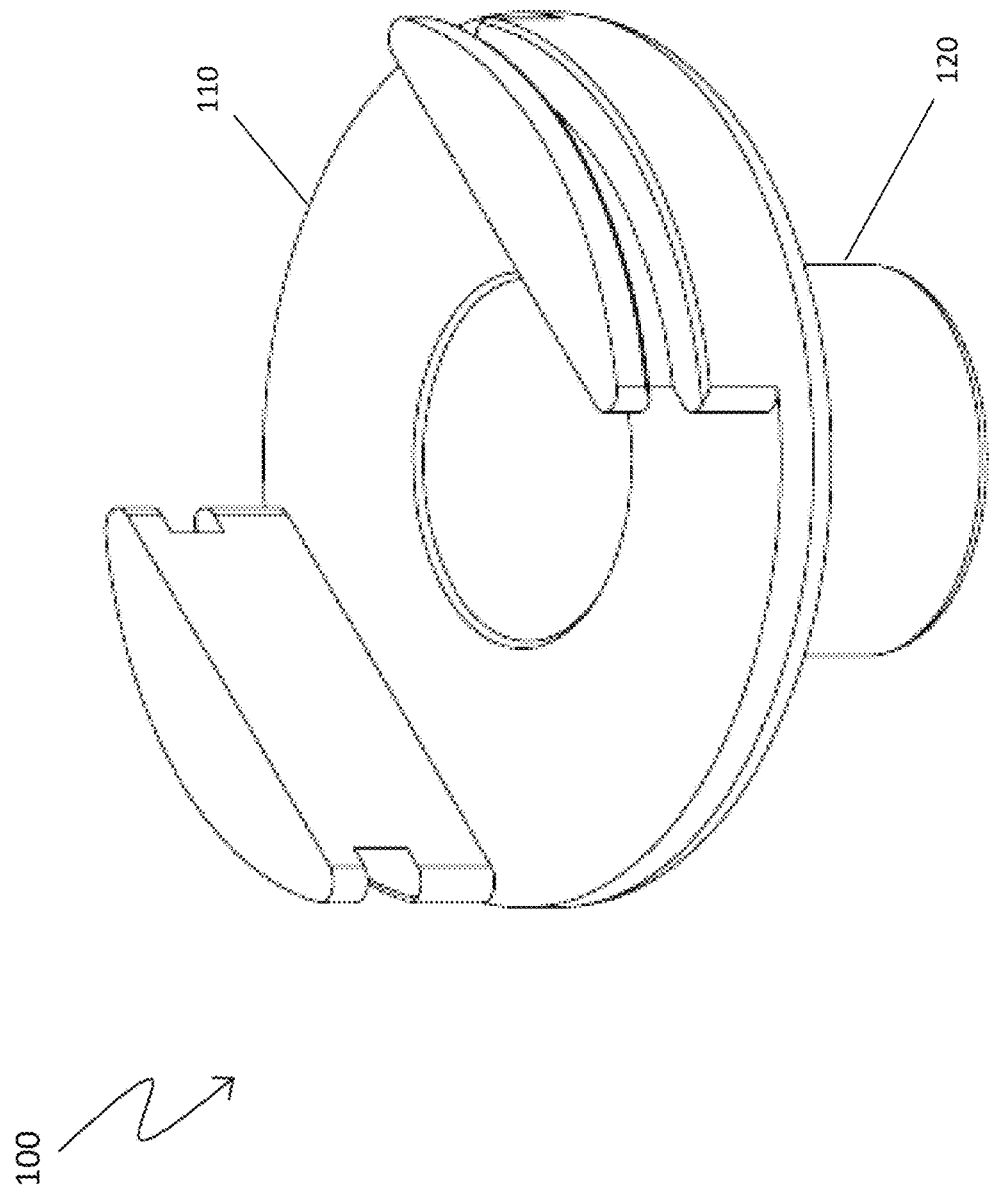
FIG. 1 illustrates a perspective view of a representative embodiment of fastener 100 of the present disclosure.

Embodiments of the present disclosure are directed to fasteners 100 for securing a bolt 14 inserted through a hole 12 in a structure 10. In particular, fasteners 100 of the present disclosure may be configured for attachment to an opposing surface of structure 10 such that fastener 100 may automatically receive and secure a distal portion of bolt 14 extending through hole 12. As configured, a person installing bolt 14 from a proximal side of structure 10 is not required to physically access the opposing side of structure 10 in order to secure bolt 14 in place within hole 12 of structure 10. While sometimes described in the context of aircraft structures herein, it should be noted that the present fastener 100 may be used or adapted for use in any industry for cold working a hole and retaining a bolt in any suitable structure.

Fasteners 100 of the present disclosure satisfy a long-felt need for robust fasteners that are capable of remaining securely attached to structure 10, while minimizing a diameter of hole 12 required for accommodating the fastener and bolt 14 there within. More specifically, embodiments of fasteners 100 leverage a combination of design features to meet these needs, including a one-piece construction featuring a very thin-walled bushing that may be expanded within hole 12 without damage to securely anchor fastener 100 to structure 10 along with an optional adhesive. As configured, fasteners 100 of the present disclosure exhibit high-torque out performance while minimizing any required hole expansion (and thereby preserving edge distance). Related benefits include reduced maintenance requirements and increased lifespan of structure 10, as loads in structure 10 can be distributed between more holes/fasteners, and cracks or corrosion can be repaired multiple times before exceeding permissible edge distance limitations due to the minimal additional hole expansion required for accommodating the thin-walled bushing of fasteners 100, as later described in more detail.

Embodiments of the present disclosure are further directed to an installation tool 200 for installing fasteners 100 (and other similar fasteners). In particular, installation tool 200 may automatically measure the mandrel pull force applied during the installation of each fastener 100 and immediately provide a technician using installation tool 200 with feedback as to whether the installation was performed within specification (i.e., passed/failed), which can in turn reduce installation and maintenance times, and improve reliability and part lifespan, amongst other benefits. Further, installation tool 200 may record the installation force measurements for each fastener 100 that is installed, and thereby create an auditable record that may be analyzed to improve installation and maintenance protocols, and to reduce the need for supervision over the installation process, amongst other benefits. Still further, some embodiments of installation tool 200 may be configured to associate the measured pull force with a location of each corresponding fastener 100 on structure 10, thereby facilitating efforts to locate individual fasteners that may need repair, replacement, or inspection, and also allowing for location-based analysis of the associated auditable record, as later described in more detail.

Rivetless Fastener 100

FIG. 1 illustrates a perspective view of a representative embodiment of fastener 100 of the present disclosure. Fastener 100 may generally include a retainer 110 and a bushing 120, which may be integrally formed with one another for a one-piece construction. Generally speaking, retainer 110 may be configured for securing a distal portion of bolt 14 inserted through hole 12, and bushing 120 may be configured for insertion into hole 12, where it may be expanded to securely couple bushing 120 with hole 12. In some embodiments, expansion of bushing 120 may securely couple bushing 120 with hole 12 via friction between the expanded bushing 120 and hole 12, while in other embodiments, expansion of bushing 120 may serve to enhance the bond of an optional adhesive 130 between bushing 120 and hole 12. Whether by friction, an enhanced adhesive bond, or a combination thereof, expansion of bushing 120 may serve to securely anchor retainer 110 to the portion of structure 10 surrounding hole 12 due to the one-piece construction of fastener 100, as later described in more detail. The thin wall of bushing 120 may minimize the amount of hole expansion necessary to accommodate bushing 120, while coldworking expansion of bushing 120 and the adhesive bond generated by adhesive 130 may combine to secure bushing 120 strongly within hole 12 without buckling or otherwise damaging the thin wall of bushing 120. The one piece construction of the present fastener, in turn, results in bushing 120 helping to anchor fastener 100 securely in place.

Retainer 110

FIG. 2A, FIG. 2B, FIG. 2C, and FIG. 2D illustrate front, side, top, and bottom views of fastener 100. In the representative embodiment shown, retainer 110 of fastener 100 may generally include a bottom surface 112 configured for positioning against a surface of structure 10 surrounding hole 12, and a coupler 114 for attaching a nut 116 for securing a distal portion of bolt 14 extending from hole 12.

Bottom surface 112 of retainer 110, in various embodiments, may be shaped to provide a flush interface against the surface of structure 10 surrounding hole 12. For example, in an embodiment, bottom surface 112 may be flat so as to provide a flush interface with structures 10 having a flat surface surrounding hole 12. Similarly, in another embodiment, bottom surface 112 may have a curvature designed to lay flush with structures 10 having a curved surface surrounding hole 12. More specifically, bottom surface 112, in an embodiment, may have a concave curvature dimensioned to provide a flush interface with a similarly dimensioned convex surface surrounding hole 12, whereas in another embodiment, bottom surface 112 may have a convex curvature dimensioned to provide a flush interface with a similarly dimensioned concave surface surrounding hole 12. While bottom surface 112 of retainer 110 is preferably designed to provide a flush interface with the surface of structure 10 surrounding hole 12, it should be appreciated that embodiments of fastener 100 having a non-flush interface between bottom surface 112 and the surface of structure 10 surrounding hole 12 may perform similarly in many cases and that the present disclosure is not intended to be limited as such.

Figure 2B:
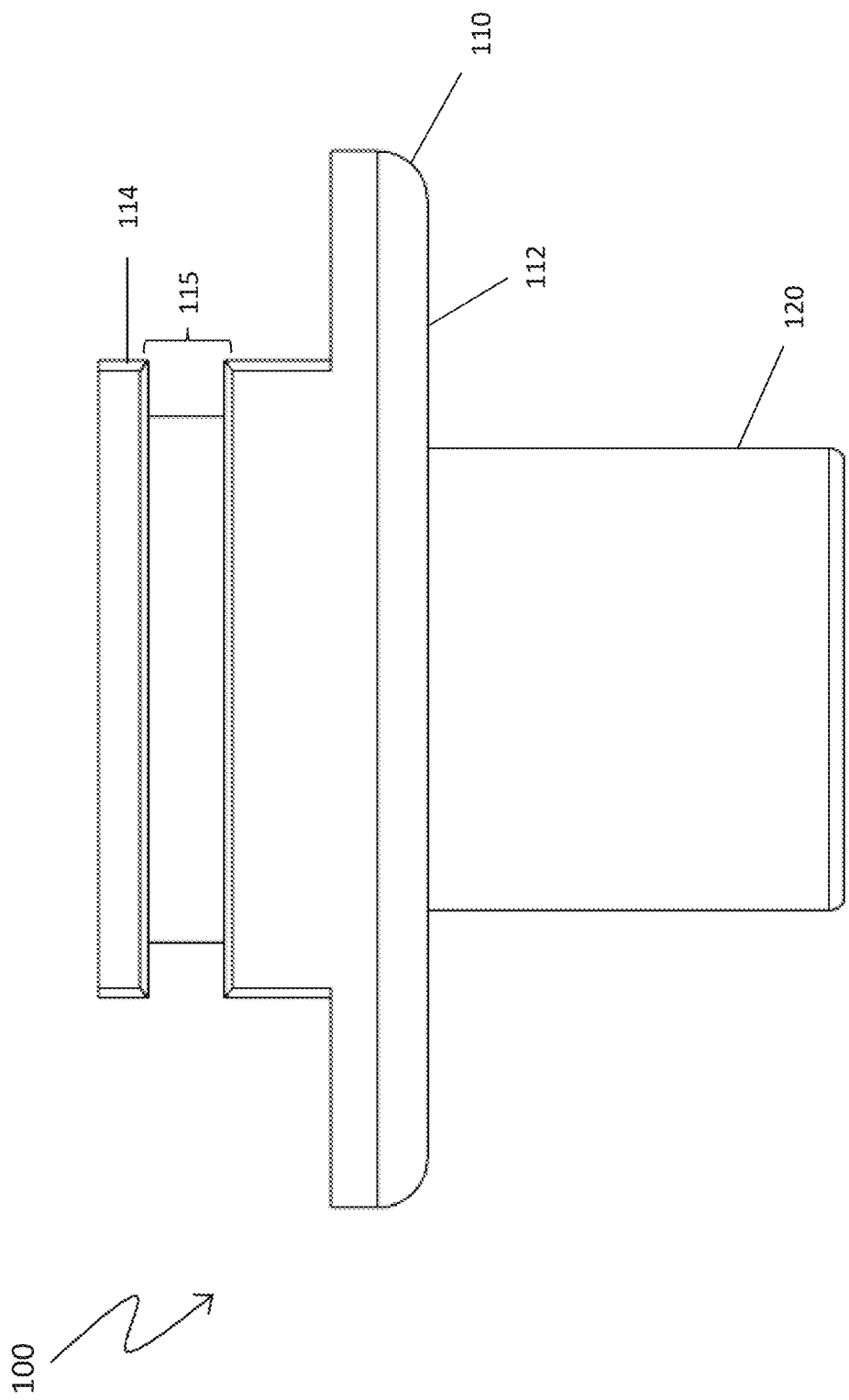
Figure 2C:
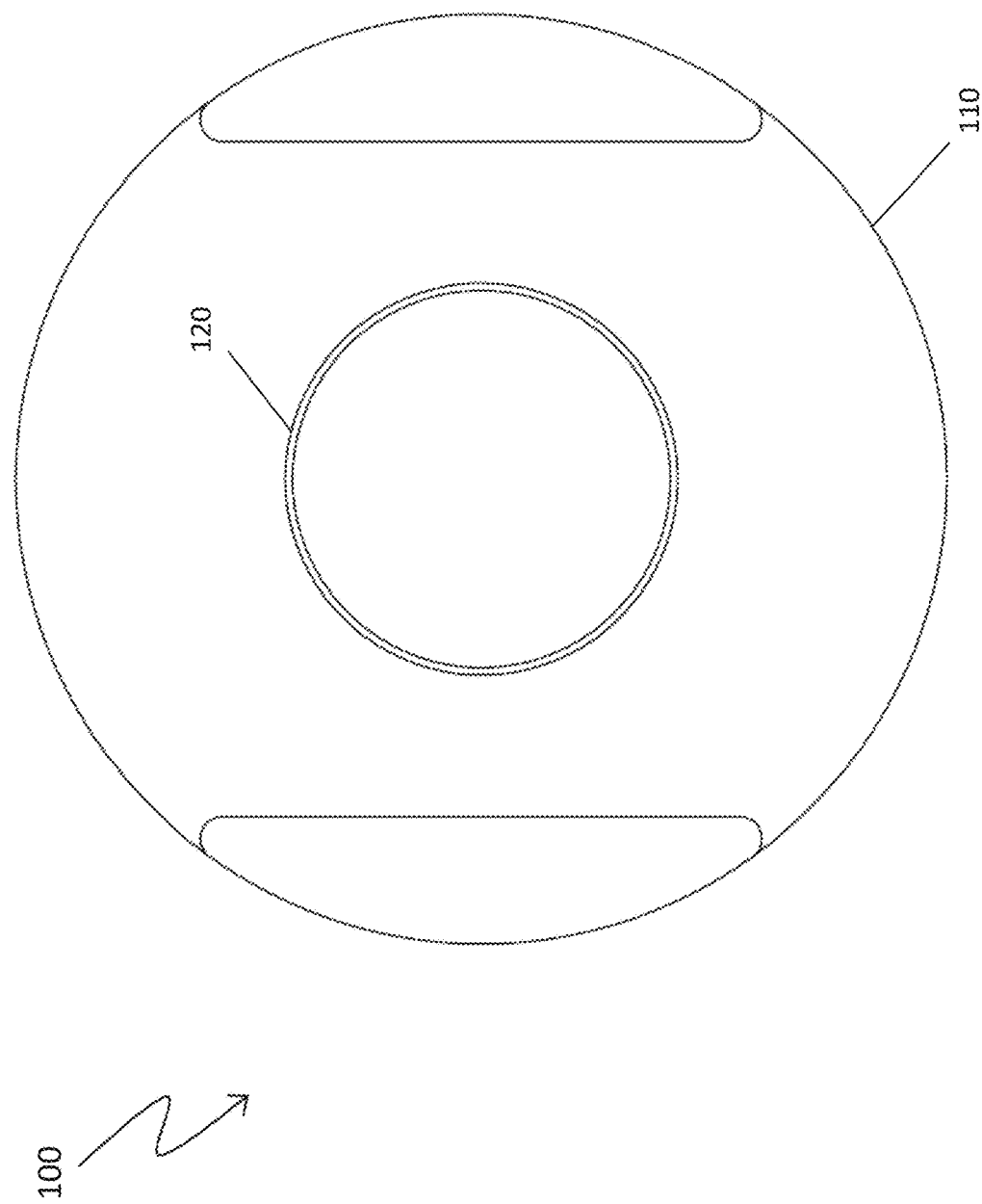
Figure 2D:
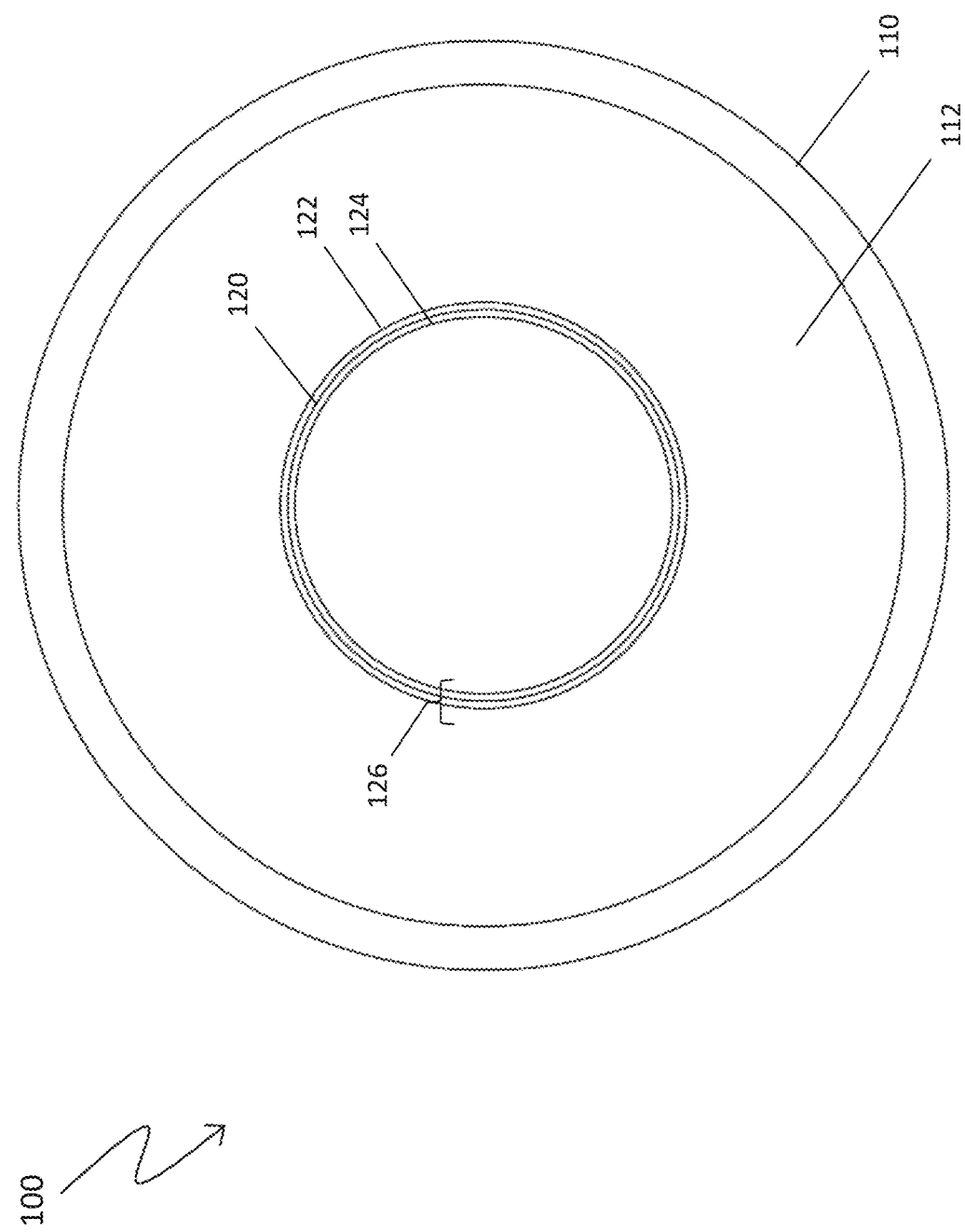
Figure 2E:
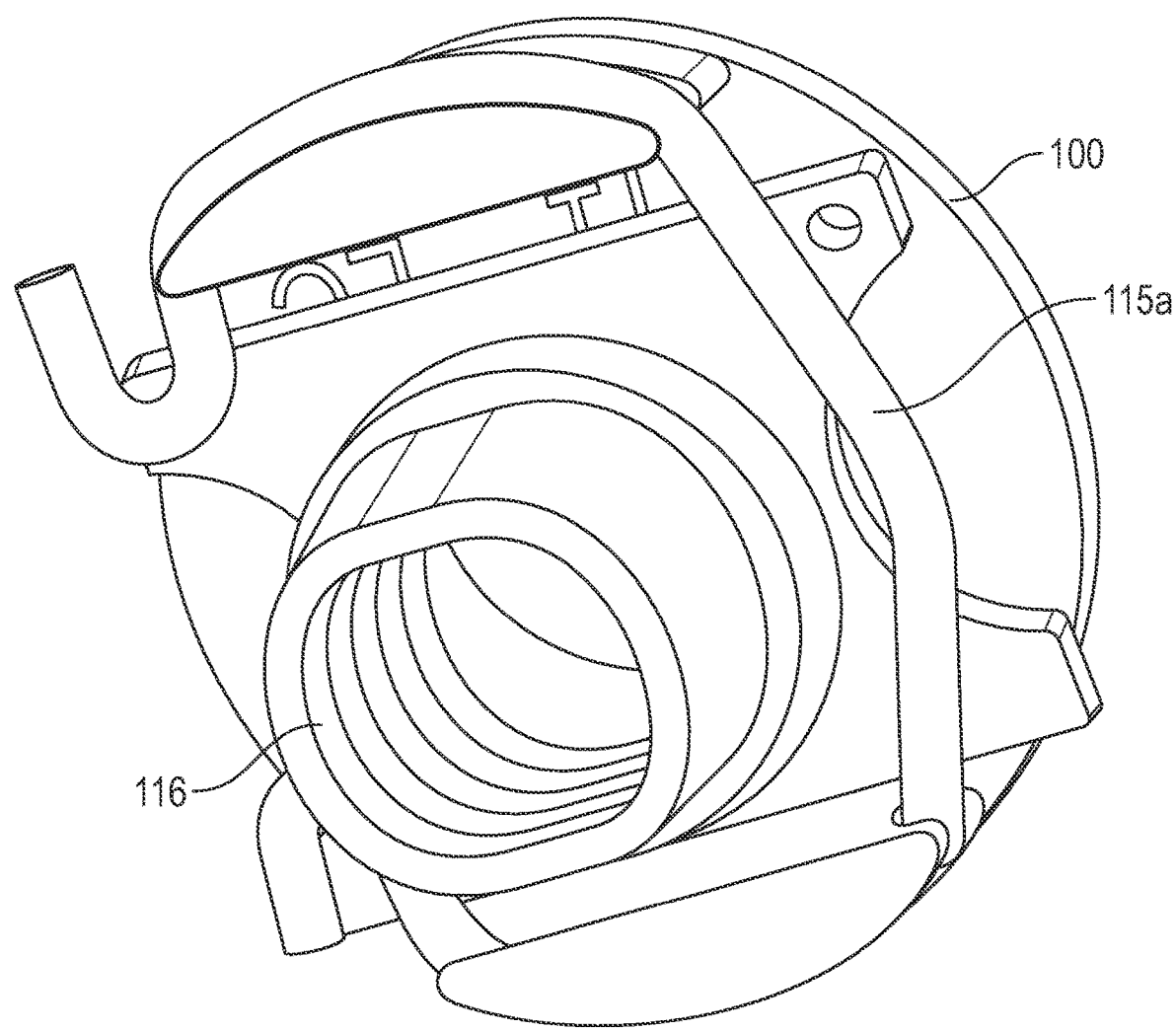
FIG. 2E depicts coupler 114 including a groove 115 for receiving a spring clip 115a configured to secure nut 116 on fastener 100.

Coupler 114 of retainer 110, in various embodiments, may include any suitable mechanism or structural feature configured for holding nut 116 in alignment with bushing 120. In particular, coupler 114 may hold nut 116 such that a longitudinal axis of nut 116 is substantially aligned with a longitudinal axis of bushing 120 (both vertical in FIG. 2A) such that when bolt 14 is inserted into bushing 120, the distal portion of bolt 14 exits bushing 120 in axial alignment with the central hole of nut 116. As configured, coupler 114 may allow for nuts 116 of various sizes and designs to be used with a given fastener 100, and can be swapped out without the need for removing fastener 100 from structure 10. In the embodiment shown, coupler 114 includes a groove 115 for receiving a spring clip 115a configured to secure nut 116 on fastener 100, as shown in FIG. 2E. It should be recognized that groove 115 is but one example of a suitable coupler 114 for holding nut 116 in alignment with bushing 120, and that the present disclosure is not intended to be limited to any particular design of coupler 114. In another embodiment (not shown), nut 116 may be formed as part of retainer 110 or otherwise attached thereto. Nut 116, however it may be associated with retainer 110, may be internally threaded in embodiments configured for securing bolts 114 equipped with external threading.

Bushing 120

Still referring to FIG. 2A, FIG. 2B, FIG. 2C, and FIG. 2D, in the representative embodiment shown, bushing 120 of fastener 100 may extend from bottom surface 122 of retainer 110, and may be shaped to conform with a shape of hole 12 in structure 10. In a representative embodiment, bushing 120 may substantially cylindrical and thereby fit into a standard hole produced by a cylindrical drill bit. The length of bushing 120, in various embodiments, may be configured to substantially match the depth of hole 12 in structure 10 and may be substantially hollow to accommodate bolt 14 therethrough.

As later described in more detail, it may be advantageous to minimize the outer diameter of bushing 120 so as to minimize a diameter of hole 12 required for accommodating bushing 120 and bolt 14 there within. Bushing 120, in various embodiments, may generally include an outer surface 122 and an inner surface 124 separated by a thickness dimension 126 (hereinafter referred to as "wall thickness 126"), as shown. Outer surface 122 and inner surface 124, in various embodiments, may define an outer diameter and an inner diameter of the substantially cylindrical and hollow body of bushing 120. Thus, in various embodiments, it may be preferable to minimize the inner diameter and wall thickness 126 of bushing 120.

In operation, bolt 14 may extend through the hollow portion of bushing 120 defined by inner surface 124 and thus, in various embodiments, inner surface 124 may be dimensioned to accommodate an outer diameter of bolt 14. Accordingly, in various embodiments, inner surface 124 may be dimensioned to match or only slightly exceed the outer diameter of bolt 112. That said, because bushing 120 may be expanded during the installation process, in various embodiments, inner surface 124 may be dimensioned to have a diameter slightly smaller than the outer diameter of the particular bolt 14 being used in a given application. For example, if the installation process calls for a 3.5% expansion of bushing 120 during installation, inner surface 124 may be dimensioned to have a proportionally smaller diameter (e.g., about 1.5% to about 4.5% smaller) and still accommodate bolt 14 once fastener 100 is installed. One of ordinary skill in the art will recognize an appropriate inner diameter of bushing 120 for accommodating bolt 14 as installed in structure 10 in accordance with the teachings of the present disclosure.

As previously noted, it may also be advantageous to minimize wall thickness 126 in an effort to minimize the outer diameter of bushing 120. That said, if wall thickness 126 is too small, bushing 120 may not exhibit the structural strength required for expansion and various loads experienced by structure 10 without bushing 120 being damaged. Accordingly, in various embodiments, bushing 120 may be provided with a wall thickness 126 optimized for both of the aforementioned considerations—namely, a minimum wall thickness required to withstand an expected amount of expansion and applied loads for a given application. Based on the later described analysis and testing of various designs and materials (e.g., machined 17-4 stainless steel, stainless steel alloys, titanium), bushing 120 may exhibit the requisite structural integrity with wall thicknesses 126 ranging from about 0.005 inches to about 0.030 inches and greater. Accordingly, in various embodiments, bushing 120 may have a wall thickness ranging from about 0.005 inches to about 0.030 inches, and more preferably, about 0.010 inches in an embodiment. Of course, one of ordinary skill in the art following the teachings of the present disclosure will recognize an appropriate wall thickness 126 for satisfying the above referenced factors for a given application without undue experimentation.

Outer surface 122, as previously noted, may define an outer diameter of bushing 120 and, in some embodiments (e.g., no intervening adhesive 130), may securely couple with the inner wall of hole 12 via friction fit. To that end, outer surface 122, in various embodiments, may include texturing (not shown) configured to increase a coefficient of friction of outer surface 122 and thereby enhance the friction fit with hole 12. For example, outer surface 122 may be provided with raised bumps, raised cross-hatching, or other protrusions for enhancing its frictional coefficient. Additionally or alternatively, outer surface 122, in various embodiments, may be provided with texturing configured to help retain optional adhesive 130 thereon. Likewise, bottom surface 122 of retainer 110 may be provided with texturing for either or both of the aforementioned purposes as well (noting that bottom surface 122 may engage the surface of structure 10 surrounding hole 12, rather than the inner surface of hole 12 as with outer surface 122 of bushing 120). While texturing may increase friction and help to anchor fastener 100 in place, one of ordinary skill in the art will recognize that, in certain applications, texturing could cause damage to the inner surface of hole 12 and perhaps unfavorably reduce the life extension benefits of coldworking. One of ordinary skill in the art will recognize without undue experimentation a suitable texturing (if any) for enhancing anchoring while maintaining desired part life properties.

Manufacturing and Construction of Fastener 100

Fastener 100, in various embodiments, may be constructed of any material suitable for attaching to structure 10 and retaining bolt 14 in hole 12 in accordance with the teachings set forth in the present disclosure. In various embodiments, fastener 100 may be constructed of a metallic material having high structural strength to avoid ripping or buckling during installation and under applied loads, but malleable enough for being expanded within hole 12 as later described. Representative examples of such a metallic material include, without limitation, stainless steel (e.g., 17-4 grade, Custom 465 grade), titanium, and their alloys. One of ordinary skill in the art will recognize other suitable materials without departing from the scope of the present disclosure.

Retainer 110 and bushing 120, in various embodiments, may be integrally formed with one another and thereby provide fastener 100 with a one-piece construction. As later described in more detail, this one-piece construction may allow bushing 120 to serve in part as an anchor for securing retainer 110 in position against the surface of structure 10 surrounding hole 12.

To that end, bushing 120 may be machined from a single piece of metallic material in accordance with various embodiments. For example, a representative manufacturing approach may begin with a stock of desired material, such as the material described above. The stock may be machined first to rough size and shape, and then to final dimensions, using a lathe, CNC lathe, Swiss lathe, CNC milling machine, CNC machining center, or other suitable tool(s). The dimensioned material may be inspected for dimensional accuracy, and any burrs and rough edges may be removed using a tumbling machine, mechanical sanding, manual sanding, mechanical filing, manual filing, or any other suitable tool(s) and technique(s). Next, it may be cleaned to remove any oils, lubricants, cutting fluid, or other contaminates that may have been present on the original stock or introduced during the manufacturing process, and any foreign metal particles and other debris may be removed such as tool steel and metal shavings that may have become embedded in the surface. Fastener 100 may be finished with one or more coatings for preserving the material (e.g., preventing corrosion, oxidation) via chemical cleaning, chemical etching, passivation, anodizing, galvanizing, electroplating, powder coating, or other suitable finishing process(es).

Installing Fastener 100 with Cold Expansion

Figure 3A:
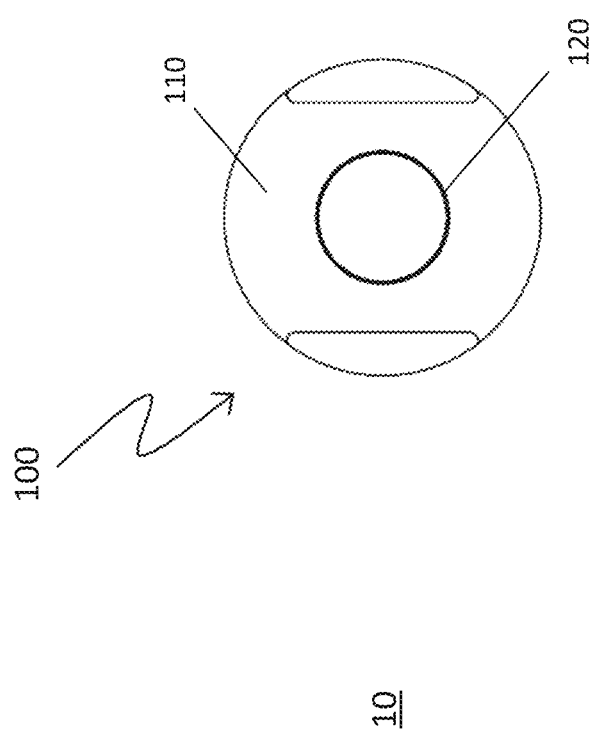
FIG. 3A, FIG. 3B, and FIG. 3C illustrate top, side, and cross-sectional views of a representative embodiment of fastener 100 as installed in hole 12 of structure 10.
Figure 3B:
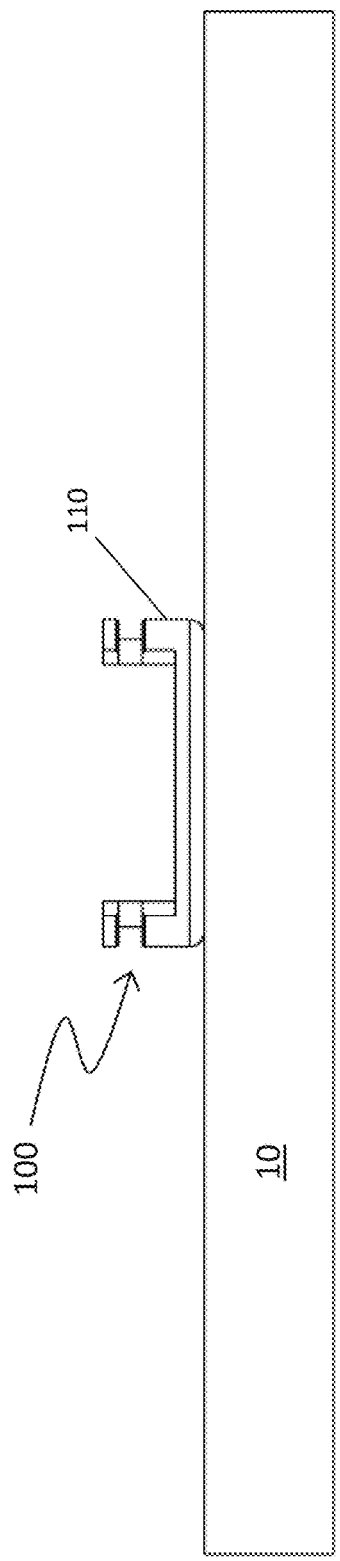
Figure 3C:
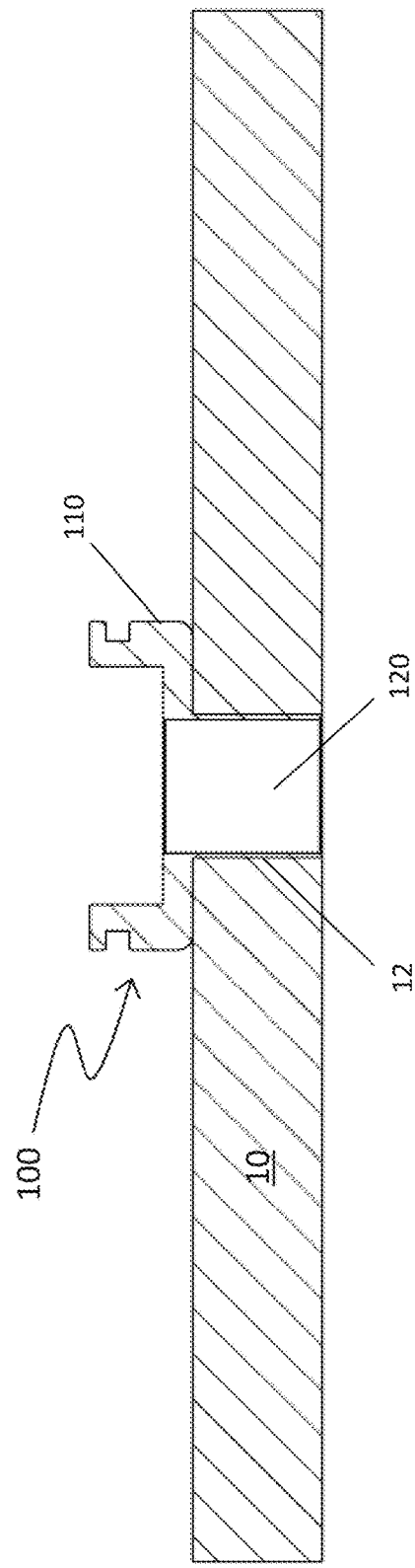

FIG. 3A, FIG. 3B, and FIG. 3C illustrate top, side, and cross-sectional views of a representative embodiment of fastener 100 as installed in hole 12 of structure 10. Fastener 100, in various embodiments, may be positioned on an opposing side of structure 10 from which bolt 14 is inserted into hole 12 so as to receive the distal end of bolt 14 when inserted. As best seen in the cross-sectional view of FIG. 3C, bushing 120 resides within hole 12 and bottom surface 122 is positioned against the surface of structure 10 surrounding hole 12.

Generally speaking, fastener 100 may be installed on structure 10 in accordance with standard coldworking processes known in the art. For example, hole 12 may be prepared (e.g., drilled, reamed, and cleaned), and fastener 100 positioned with bushing 120 inserted in hole 12 and bottom surface 122 of retainer 120 positioned against the surface of structure 10 surrounding hole 12, as described above. Next, a split-sleeve may be attached to an appropriately-sized tapered mandrel 20 and inserted into bushing 120 through retainer 110. The tapered mandrel 20 may be attached to a puller tool (e.g., manual, hydraulic, electrical (wired or battery-powered), etc.) and pulled to expand bushing 120 within hole 12. Absent any optional adhesive 130 between bushing 120 and hole 12, expansion of bushing 120 may securely couple bushing 120 with hole 12 via a friction fit between outer surface 122 of bushing 120 and the inner surface of hole 12. That said, frictional coupling may be present in embodiments in which adhesive 130 is used, but is not present throughout the entire interface between bushing 120 and hole 12, such as if some of the adhesive squeezed out during expansion of bushing 120 or if adhesive 130 were only applied to portions of outer surface 122 of bushing 120. In such situations, portions of outer surface 122 of bushing 120 may be in direct contact with the inner surface of hole 12, and thus may provide for friction-based coupling in these areas. The one-piece construction of the present fastener 100, in turn, results in the expanded bushing 120 helping to anchor retainer 110 against the surface of structure 10 surrounding hole 12.

Notably though, while split sleeves are typically used to reduce the amount of pulling force needed to expand a traditional bushing (i.e., a bushing having a wall thickness of 0.050 inches or greater), testing shows that the split sleeve serves to protect the relatively thin-walled bushings 120 of the present fastener 100 during the expansion process. In particular, certain prototypes of fastener 100 made of Titanium, Custom 465 grade stainless steel, and 17-4 grade stainless steel, and having wall thicknesses 126 of 0.010 inches, were damaged (i.e., ripped) during installation when a split sleeve was not used. Thus, the combination of a split-sleeve and thin-walled bushings (i.e., those having wall thicknesses less than about 0.030 inches) provided the unexpected result of protecting the bushing from damage during installation, and may allow for fastener 100 to be expanded further than it otherwise could be (e.g., as much as about 4.5% or more) using traditional cold expansion techniques without incurring damage.

Installing Fastener 100 with Cold Expansion and Adhesive 130

Figure 4A:
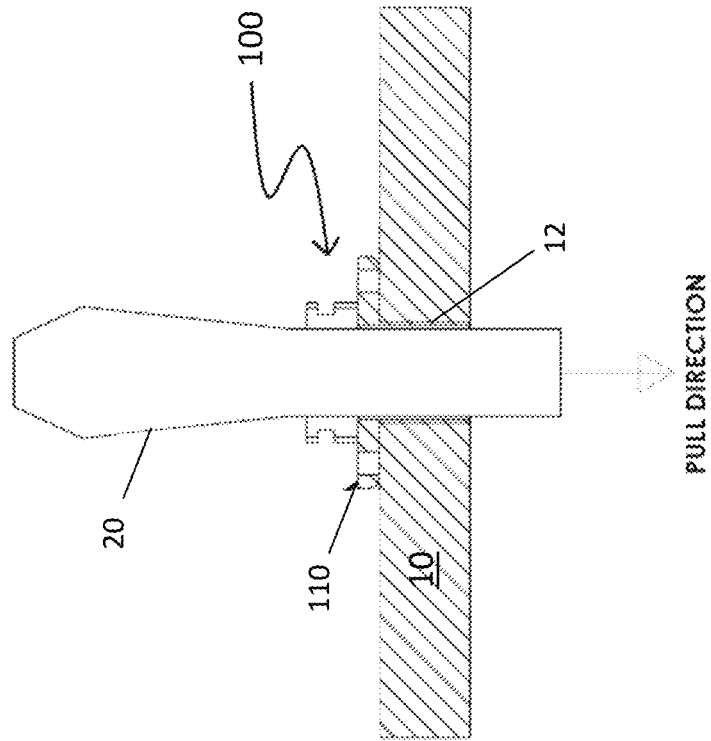
FIG. 4A and FIG. 4B, illustrate another approach for installing fastener 100 on structure 10 in accordance with a representative embodiment of the present disclosure.
Figure 4B:
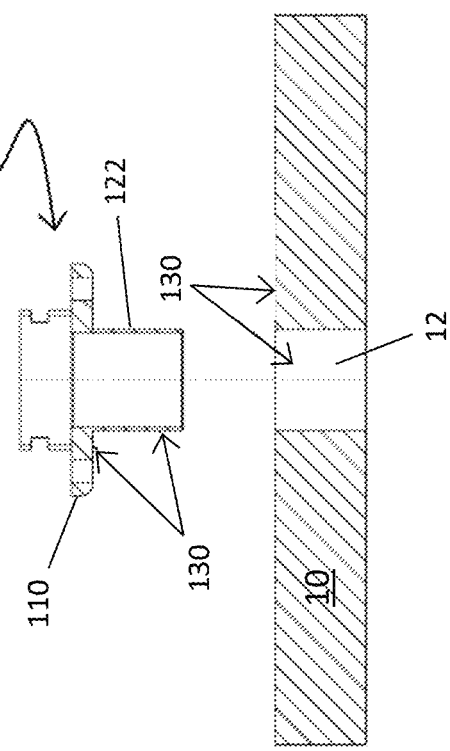

FIG. 4A and FIG. 4B illustrate another approach for installing fastener 100 on structure 10 in accordance with a representative embodiment of the present disclosure. In the approach shown, an adhesive 130 may be applied to fastener 100 and/or contacted portions of structure 10 to form an adhesive bond between fastener 100 and structure 10. Depending on the embodiment, the adhesive bond created by adhesive 130 may serve to securely couple bushing 120 with hole 12 and/or retainer 110 with surface 10, and thereby prevent fastener 100 from torquing-out or otherwise spinning out of hole 12, and falling off structure 10. As configured, well in excess of about 165 inch-pounds to about 175 inch-pounds of torque may be required to torque out various embodiments of fastener 100 from hole 12.

Adhesive 130, in various embodiments, may include any adhesive material suitable for forming an adhesive bond between components of fastener 100 and structure 10, and may vary based at least in part on the particular materials and construction of fastener 10 and structure 10. For example, many aircraft structures such as wings may be made of metallic or composite materials, and thus may have different properties requiring different adhesives to form a good bond. Representative adhesives 130 that may be suitable for metal-to-metal bonds may include, without limitation, Acrylic (e.g., PermaBond HM162) 2-part Methacrylate (e.g., Huntsman Araldite F305), 2-Part Polysulfide (e.g., PPG PS890) and 2-part Epoxy (e.g., 3M Scotch Weld 405), while representative adhesives 130 that may be suitable for metal-to-composited bonds may include, without limitation, Master Bond EP31 two component epoxy, Supreme 10HT one component epoxy, Master Bond's EP21TDCHT flexibilized epoxy adhesive, 3M™ Scotch-Weld™ Acrylic Adhesive DP8410NS, 3M™ Scotch-Weld™ Multi-Material Composite Urethane Adhesive DP6310NS, and the like.

Referring to FIG. 4B, in various embodiments, adhesive 130 may be applied to one or both of retainer 110 and bushing 120. In particular, in an embodiment, adhesive 130 may be applied to bottom surface 112 of retainer 110 so as to provide an adhesive bond at the interface between bottom surface 112 and the surface of structure 10 surrounding hole 12. This adhesive bond may provide a direct coupling between retainer 110 and structure 10, as opposed to relying solely on the indirect coupling of retainer 110 to structure 10 via the coupling of the integrally-attached bushing 120 and the inner surface of hole 12.

Additionally or alternatively, in an embodiment, adhesive 130 may be applied to outer surface 122 of bushing 120 so as to provide an adhesive bond at the interface between outer surface 122 and the inner surface of hole 12. Expansion of bushing 120 may enhance this adhesive bond, in various embodiments, by centering bushing 120 within hole 12 and reducing any gap between outer surface 122 of bushing 120 and the inner surface of hole 12. Centering bushing 120 with hole 12 and reducing this gap may serve to thin the bond line provided by the adhesive between outer surface 122 of bushing 120 and the inner surface of hole 12, and thus enhance the bond provided by adhesive 130.

In some embodiments, bushing 120 may be securely coupled with hole 12 entirely or primarily by the adhesive bond provided by adhesive 130. This may be particularly characteristic of (but not limited to) installations of fastener 100 in composite structures 10, as composite materials tend to be more brittle than metallic materials, and thus may crack rather than compress if bushing 120 and hole 12 are expanded significantly. That said, in various embodiments, bushing 120 may still be expanded to enhance the bond created by adhesive 130 between bushing 120 and hole 12, and thereby provide a significant improvement compared with the bond that may otherwise be generated by adhesive 130 absent expansion of bushing 120. As noted above, in other embodiments, adhesive 130 may not be present throughout the entire interface between bushing 120 and hole 12 and, as such, those portions of bushing 120 and hole 12 that are in direct contact may be coupled at least in part via friction, and those portions separated by adhesive 130 may be coupled at least in part via adhesive bond, which may notably be enhanced by the expansion process.

Notably, the enhanced adhesive bond created by adhesive 130 between expanded fastener 100 and structure 10 may allow for a relatively thinner-walled fastener 100 to be used, all without sacrificing the overall strength of the attachment between fastener 100 and structure 10. Such an approach may be desirable, for example, in situations where it is of greater importance to minimize the diameter of hole 12 versus maximize the strength of the attachment of fastener 100 to structure 10. In particular, the adhesive bond created by adhesive 130 may to offload or eliminate the degree to which friction fit must contribute towards anchoring fastener 100 to structure 10, thereby reducing the amount of expansion required and thus allowing for a relatively thinner wall thickness 126 to be used without incurring damage. For example, in such situations, a fastener 100 with a relatively smaller wall thickness 126 (e.g., about 0.010 inches) may be utilized, and expanded to a lesser degree (e.g., between about 1.5% and about 3.5%) to produce a relatively weaker or no friction fit. The weaker friction or lack of friction would; however, be compensated for by the adhesive bond created by adhesive 130 (and enhanced by small expansion of bushing 120), and thus the overall strength of the attachment of fastener 100 to structure 10 would be maintained, and the diameter of hole 12 reduced relative to using a thicker-walled fastener. Stated otherwise, the thin wall thickness 126 may minimize the amount of hole 12 expansion necessary to accommodate bushing 120, while coldworking and adhesive 130 may combine to secure bushing 120 strongly within hole 12 without buckling or otherwise damaging the thin wall of bushing 120.

As noted above, it should be noted that adhesive 130 may play a significant role in attaching fastener 100 to structure 10, especially when structure 10 is formed of a composite material. Composite materials used in aircraft structures, for example, have little to no plasticity compared with metal structures, and thus it may not be possible to use high levels of expansion to secure bushing 120 to the sides of hole 12. In such cases, the friction fit may be relatively weak. This issue may be overcome, in some embodiments, by applying adhesive 130 to outer surface 122 of bushing 124 such that expansion of bushing 120, albeit a small amount, causes adhesive 130 to seal and bond bushing 120 uniformly with the sides of hole 12.

Conversely, in some situations it may be of greater importance to ensure that fastener 100 is very strongly attached to structure 10 versus minimizing the diameter of hole 12. In such situations, a fastener 100 with a relatively larger wall thickness 126 (e.g., about 0.030 inches, but still significantly smaller than the traditional 0.050" wall thickness of existing nut plates) may be utilized, with or without adhesive 130, and expanded significantly (e.g., by about 3.5% to about 5%) without damaging bushing 120 due to its relatively larger thickness. If adhesive 130 is used, the resulting adhesive bond as enhanced by the expansion of bushing 120, may be even stronger than that generated by the smaller expansions previously described. Additionally or alternatively, the resulting adhesive bond may supplement the strong anchoring effect provided by friction fit between any portions of bushing 120 and hole 12 that may be in direct contact, such that fastener 100 is very strongly secured to structure 10.

It should be recognized that adhesive 130 may additionally or alternatively be applied to corresponding portions of structure 10 (and hole 12) in contact with these portions of fastener 100 to similar effect.

Figure 4C:
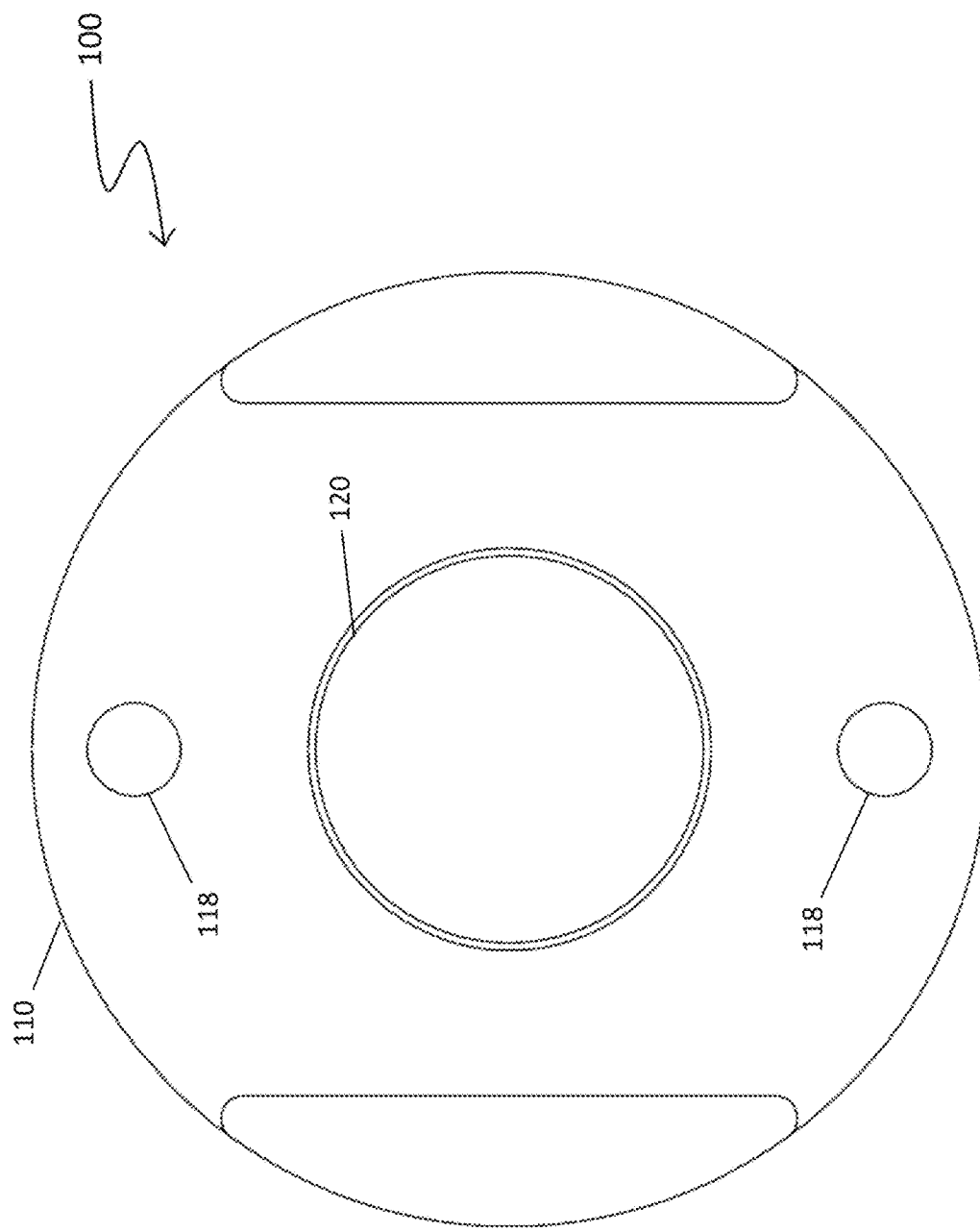
FIG. 4C illustrates in an embodiment, fastener 100 may include one or more holes 118 extending through retainer 110 for enhancing the adhesive bond between retainer 110 and the surface of structure 10 surrounding hole.

Referring now to FIG. 4C, in an embodiment, fastener 100 may include one or more holes 118 extending through retainer 110 for enhancing the adhesive bond between retainer 110 and the surface of structure 10 surrounding hole 12. Hole(s) 118, shown here as extending through a bottom portion of retainer 110 including bottom surface 122, may be configured to allow adhesive 130 to form a bond in a different dimension (e.g., vertical) to strengthen the adhesive bond between retainer 110 and the surface of structure 10 surrounding hole 12.

Adhesive 130, in some embodiments, may be applied by a technician during the installation process (e.g., by brushing, spraying, rolling, or dipping) while, in other embodiments, adhesive 130 may be applied at the time of manufacturing (e.g., at the factory before fasteners 100 are even shipped to technicians for installation). In the latter embodiments, adhesive 130 may, for example, be applied to fastener 100 and covered with protective material configured to be peeled away by a technician just prior to installation. In another example, adhesive 130 may be configured to be encapsulated and pressure activated, meaning it is released or becomes sticky in response to applied pressure. As configured, an encapsulated pressure-activated adhesive 130 may be applied at the time of manufacturing, transported and handled without creating a mess, and activated to form the adhesive bond when pressed against structure 10 (e.g., pressed against the inner wall of hole 12 during the expansion of bushing 120 and/or pressed against the surface of structure 10 surrounding hole 12 during installation or when a technician tightens down bolt 14), as shown in FIG. 4B. Representative examples of a pressure-activated adhesive 130 may include, without limitation, Microencapsulated Acrylates (e.g., precote 80), Epoxy (e.g., 3M 2353), Acrylic (e.g., Loctite 2040). It should be appreciated that, generally speaking, embodiments in which adhesive 130 is applied during manufacturing as opposed to during installation may reduce the effort, time, and cost required for a technician to install fastener 100 on structure 10.

Alternative Installation Techniques

Fastener 100, in various embodiments, may be installed according to several additional approaches. For example, in an embodiment, a high-frequency hammer, hydraulic, or electrical puller may be used to pull mandrel 20 through hole 12. This method may greatly reduce the pull force required to pull mandrel 20 through hole 12. In another embodiment, mandrel 20 may be attached to a small gear box having a favorable gear ratio to facilitate a user in pulling mandrel 20 through hole 12. The gears of the small gear box may be engaged by a manual wrench, an electric drill, a pneumatic drill, or any other suitable mechanism. Further, mandrel 20 could be provided with notches oriented substantially perpendicular to a longitudinal axis of mandrel 20 in order to engage with the gears. This method may greatly reduce the force required to pull mandrel 20 through hole 12. In yet another embodiment, two opposing threaded rods may be arranged in parallel and engage a threaded mandrel 20 to help pull mandrel 20 through hole 12. The parallel threaded rods may be engaged by a manual wrench, electric drill, or pneumatic drill and, in one embodiment, may be contained in an enclosure. Fastener 100, along with similar nut plates and other fasteners, may also be installed using installation tool 200 according to various embodiments of the present disclosure, as later described in more detail.

Potential Advantages of Fastener 100

FIG. 5 is a chart comparing aspects of fastener 100 of the present disclosure with those of existing nut plates. Each of the existing nut plate designs suffers from one or more disadvantages compared with fastener 100.

For example, referring to the second row of the chart of FIG. 5, one type of existing nut plate is configured to be bonded to the surface of structure 10. Because these nut plates lack a barrel or similar structure extending into hole 12, they are not anchored within hole 12 as fastener 100 is. Instead, these nut plates rely solely on adhesion with the surface of hole 12, and thus are prone to falling off. Further, any coldworking to repair hole 12 is done separately from installation of such fasteners, thereby increasing the time of the repair.

Moving on to the third row of the chart of FIG. 5, another type of existing nut plate includes a thin-walled "barrel" (e.g., 0.008 inches thick) that at first glance appears similar to bushing 120 of fastener 100, but its "barrel" is configured to serve more as a protective sleeve during installation. As such, this sleeve is not fixedly attached to its retainer (resulting in a multi-piece construction), and the sleeve does not create as strong of a friction fit with the interior of hole 12 as the expanded bushing 120 of fastener 100 does. As a result, the sleeve of this type of existing nut plate does not serve to anchor itself within hole 12, and thus—by extension—does not serve to anchor the retainer to structure 10 in the way that fastener 100 does.

Referring now to the fourth and final row of the chart of FIG. 5, another type of existing nut plate includes a thick-walled barrel (e.g., 0.040-0.065+ inches thick), similar to that later shown alongside fastener 100 in FIG. 6A and FIG. 6B. Due to their thick walls, these nut plates are capable of being cold worked to high levels of expansion, and thus rely on the resulting friction fit between the expanded barrel and hole 12 for securement on structure 10. As later described in more detail, large diameter holes 12 are required to accommodate these thick-walled nut plates, and thus holes must be drilled farther apart from one another and the edges of structure 10. This reduces the number of times each hole can be repaired before the edge of the holes exceeds minimum edge distance limitations, as later described in more detail.

Turning now to the first row of the chart, embodiments of fastener 100 may provide for several advantages over existing nut plates and similar fasteners. In particular, various embodiments of fastener 100 may be lighter, less expensive, more reliable, and both quicker and easier to install than existing rivetless nut plates and similar fasteners. In fact, using fasteners 100 of the present disclosure on a military aircraft (e.g., the F-18 Hornet, F-35 Lightning, and MQ-4C Triton, and RQ-4 Global Hawk) instead of using existing nut plates, is estimated save upwards of $100,000 per aircraft. More specifically, embodiments of fastener 100 may provide at least one or more of the following advantages over existing nut plates and similar fasteners:

1) Fatigue Performance

Fastener 100 is compatible with coldworking techniques, which can be used to repair cracks around hole 12 and to prevent new cracks from forming around hole 12. Nut plates and similar fasteners lacking bushing 120 (e.g., those that simply adhere to the surface of structure 10) cannot be cold-worked in hole 12 like fastener 100, and thus do not enjoy the corresponding benefits of crack repair and prevention. When combined with a cold working process, as is the case in various embodiments of the present fasteners and installation methods, the incidence of fatigue cracks can be further mitigated, also contributing to increased structure longevity.

2) Edge Distance

After fatigue cracks have been detected structure 10, the fatigue cracks are typically be removed by enlarging holes 12. In some cases, the damaged holes 12 may be cold worked to extend the life of the newly formed holes 12 and surrounding material. It is often necessary, especially with fasteners having thick barrel walls, to enlarge damaged holes 12 by quite a bit to accommodate the replacement fastener. Oftentimes the amount the damaged hole 12 needs to be enlarged to sufficiently eliminate the cracks is less than the amount the damaged hole 12 needs to be enlarged to fit in a fastener with a relatively thick barrel wall.

Reduced edge distance can prove problematic especially in holes 12 situated close to an edge of structure 10. As the distance between the center of hole 12 and the edge of structure 10 (i.e., edge distance) decreases, the chance of structure 10 failing in that area increases. Generally speaking, from the standpoint of preserving structural integrity, it is ideal to keep edge distance above about 2, though in some cases about 1.5 is acceptable. If edge distance is already below 2 and the damaged hole 12 needs to be enlarged to repair fatigue cracks, the edge distance will be further reduced. Eventually a point is reached where hole 12 cannot be safely enlarged any further, oftentimes leading to the entire structure 10 having to be replaced or undergo more significant repairs.

The thin wall bushing 120 of fastener 100 may help to mitigate reductions in edge distance resulting from repairs. For example, while it may be necessary to enlarge hole 12 to the extent that edge distance is reduced to 1.5 in order to accommodate relatively thick wall fastener, that same hole may only need to be enlarged to the extent that edge distance is reduced only to 1.8 or 1.7 in order for the enlarged hole 12 to accommodate the relatively thin wall of fasteners 100.

In particular, hole 12 must be drilled or expanded to have sufficient diameter to accommodate a given bolt 14 and fastener within hole 12. For a given sized bolt 14, hole 12 must have a larger diameter to accommodate fasteners with thicker walls, whereas fasteners with thinner walls can be accommodated in smaller diameter holes 12. Because fasteners 100 of the present disclosure feature thinner walls than those of some existing nut plates and similar fasteners, they require relatively smaller holes 12. As such, during new builds, the corresponding holes 12 may be drilled closer to the edges of structure 10 without violating minimum edge distance requirements. Likewise, the corresponding holes 12 can be repaired using coldworking multiple times before edge distance becomes so small that structure 10 must be replaced. Accordingly, fastener 100 can be used in many situations where others cannot due to edge distance requirements, and as a corollary, can lengthen the lifespan of structure 10 by allowing for repairs near edges instead of having to replace structure 10. Likewise, the reduced edge distance impact provided by fasteners 100 may allow for replacement of other types of fasteners on existing structures that do not perform as well. For example, the F-35 utilizes surface fasteners (e.g., Click Bond nutplates, which do not extend into the hole but rather sit only on the surface of the structure) that tend to fall off often; however, because edge distance on the F-35 aircraft is often very tight to acceptable limits, it may not be possible to replace these surface fasteners with existing thicker-walled fasteners because edge distance would be reduced beyond acceptable limits. The thin-walled fasteners of the present disclosure, on the other hand, may be suitable for replacing these surface fasteners due to reduced edge distance impact. Further, in the context of a new build instead of repair, by minimizing hole diameter and thus reducing edge distance constraints, designers have more flexibility in positioning holes wherever they wish to on the structure.

For example, consider the representative embodiments of fastener 100 and a thick-walled nut plate shown in FIG. 6A and FIG. 6B. Bushing 120 of fastener 100 has a 0.010 inch wall thickness 126, while the barrel of the representative thick-walled nut plate has a thickness of about 0.050 inches, or five times that of fastener 100.

Figures 7A, 7B, 7C:
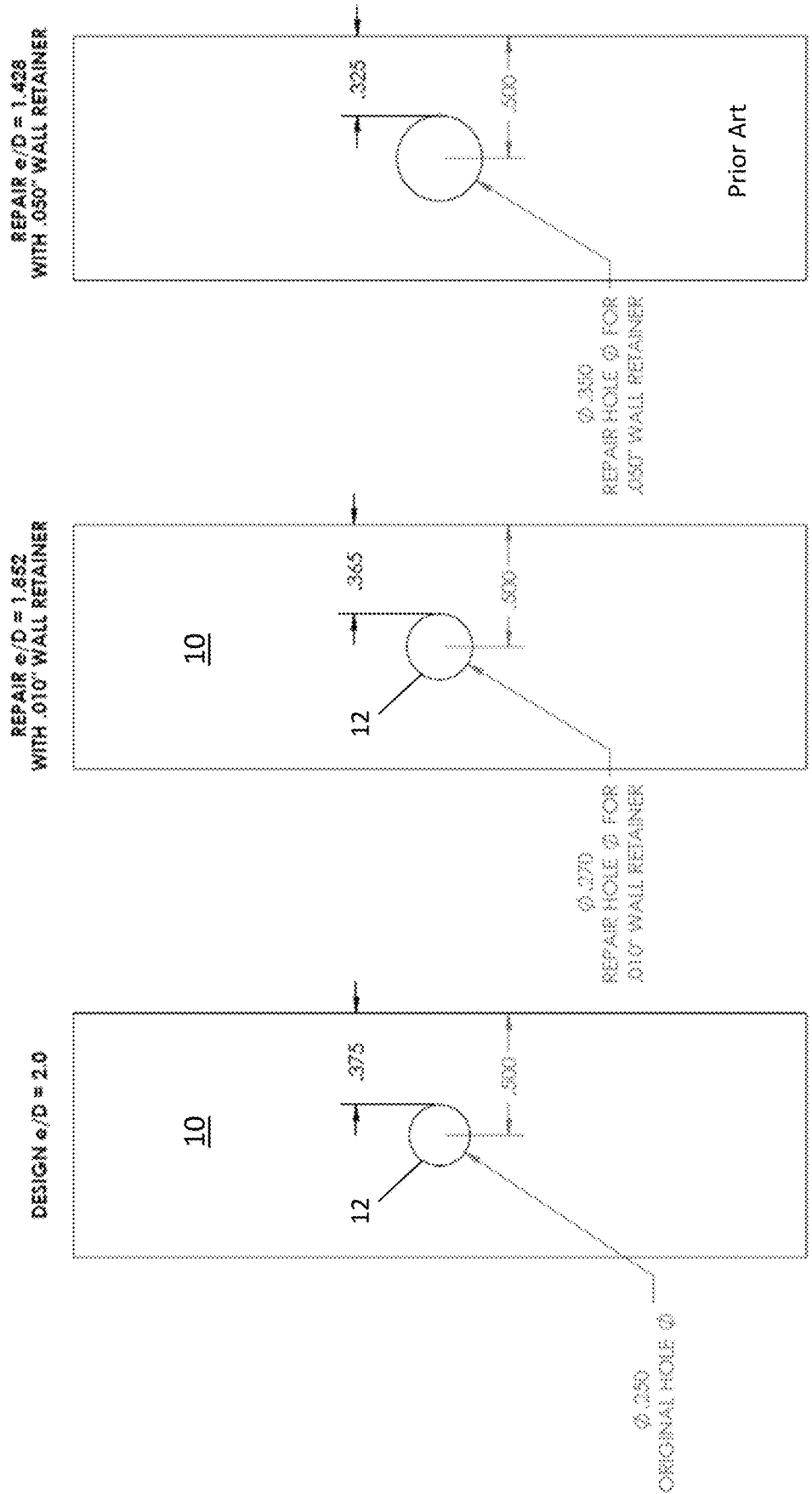
FIG. 7A, FIG. 7B, and FIG. 7C illustrate the variations in required hole diameters and resulting edge distances of the thin-walled fastener 100 and a representative thick-walled nut plate.

FIG. 7A, FIG. 7B, and FIG. 7C, illustrate the variations in required hole diameters and resulting edge distances of the thin-walled fastener 100 and a representative thick-walled nut plate presented in FIG. 6A and FIG. 6B. In particular, FIG. 7A represents a baseline, in which hole 12 has experienced cracks or corrosion and is in need of repair. Pre-repair, original hole 12 has a 0.250 inch diameter and is situated with its center 0.500 inches from the edge of structure 10, resulting in its outer edge being 0.375 inches from the edge of structure 10. As configured, original hole 12 has an edge distance of 2.0. For clarity, edge distance, or "e/D", is a metric used to express how close a hole is to the edge of a structure, in which "e" is the distance from the center of hole 12 to the edge of structure 10 and D is the diameter of hole 12. In FIG. 7A, e=0.500 inches and D=0.25 inches, so e/D=2.0.

Now, referring to FIG. 7B, hole 12 has been drilled and coldworked during installation of a thin-walled fastener 100 of the present disclosure. The thin-walled fastener 100 has a wall thickness 126 of 0.010 inches, thus hole 12 had to be expanded by 0.02 inches total to accommodate the 0.010 inch increase in thickness on each side of bushing 120. The resulting hole 12 is now 0.270 inches in diameter, and thus edge distance has been decreased by only 7.4%, from 2.0 in FIG. 7A to 1.852 in FIG. 7B.

Comparatively, with reference now to FIG. 7C, the thick walls of the nut plate required hole 12 to be expanded to a much greater extent as opposed that required when using the thin-walled fastener 100 of the present disclosure. In particular, thick-walled nut plate shown has a wall thickness of 0.050 inches (five times that of fastener 100), and thus the original hole 12 had to be expanded by 0.100 inches total to accommodate the 0.050 inch increase in thickness on each side of the barrel of the thick-walled nut plate. The resulting hole 12 is now 0.350 inches in diameter, and thus edge distance has been significantly decreased by 28.6%, from 2.0 in FIG. 7A to 1.428 in FIG. 7C.

Stated otherwise, in the context of repairing structure 10, the amount by which hole 12 needs to be expanded to accommodate a thin-walled fastener 100 of the present disclosure is significantly less than that required to accommodate a thick-walled nut plate. Despite the expansion of hole 12, the outer edge of hole 12 remains relatively far away from the edge of structure 10, and thus edge distance is mostly preserved when using a thin-walled fastener 100 of the present disclosure. Conversely, because hole 12 needs to be expanded more to accommodate a thick-walled nut plate, the outer edge of hole 12 ends up much closer to the edge of structure 10. Thus edge distance is significantly reduced when using a thick-walled nut plate compared to thin-walled fastener 100.

3) Reliability

Uniquely, fastener 100 combines the benefits of a thin-walled bushing 120 with the benefits of coldworking, all while anchoring securely to structure 10 such that fastener 100 does not easily fall off or spin out.

There has been a long-felt need for a fastener that can provide such a combination of benefits, yet nobody has found a suitable design until now. As shown in the experimental data appended to this document in Appendix B, the particular ranges of wall thickness and expansion % suitable that are suitable for achieving these benefits in combination in a one-piece design utilizing adhesives, was not easily determined. Seemingly obvious combinations of such parameters and modifications resulted in failures such as buckling of the fastener and/or low torque out values.

Anchoring may be accomplished through one or a combination of friction fit and enhanced adhesive bonding. Friction fit results from the coldworking process, and adhesive bonding may be enhanced by the coldworking process as bushing 120 is expanded. The coldworking process can be tailored (e.g., set to about 3.5% expansion) such that the cold expansion does not buckle the thin wall of the barrel, yet still expands the barrel enough to have one or a combination of: (i) a tight friction fit with the hole, and (ii) an enhanced adhesive bond, as further described above. The one-piece construction ensures that the friction fit and adhesive bond between the barrel and the hole serve to securely anchor the retainer portion. Adhesive at the interface between the retainer portion of the aircraft structure surface further enhances the reliability of the fastener.

4) Installation Time and Cost

As described above, fasteners 100 are easy and quickly installed. Existing equipment can be used, reducing tooling and training time. Down times (e.g., the amount of time an aircraft comprising structure 10 is out of service for associated repairs) are reduced due to the ease and speed at which holes 12 can be repaired with fasteners 100, as well as due to the resulting increases in longevity of structure 10.

Experimental Results

Torque-out tests were performed by PartWorks on aluminum specimens with either open holes or inserted RNPs made of either Titanium, or Stainless Alloys. Specimens were either ¼" or ⅛" thick. Our approach does not necessarily rely on large amounts of expansion for retention, so we are able to vary the expansion level to whatever is optimum for the material or application without being concerned about retention.

Figure 8:
FIG. 8 depicts constant amplitude fatigue testing as performed on coupons using a dogbone geometry.

Constant amplitude fatigue testing was performed on coupons using a dogbone geometry, as shown in FIG. 8. The specimens incorporated a central hole, with several coupons also including rivetless nut plates (RNP) in the hole. PartWorks conducted all coupon machining and RNP installation. The net section applied stress was in the 25-35 ksi range with a target to failure below 200,000 cycles (which resulted in settling on 35 ksi) and a cyclic frequency to complete the testing within the period of performance. Cycles to failure was recorded.

By cold expanding the ultrathin-wall nut plate and establishing compressive residual stresses around the hole the data show that the resulting life from this process improves by an average of 7.7 times—greater than the life of the hole when the aircraft was new. This is a plot of maximum stress versus cycles to failure for all samples tested at a net-section stress of 35 ksi. The plot shows open-hole specimens in the as machined surface condition as the baseline for comparison. Open-hole samples with corrosion damage show a debit in life compared to the baseline samples, whereas corrosion damaged samples with the rivetless nut plate fastener show an increase in life (7.66× and 7.82×) compared to the as-machined baseline and the open-hole corroded data. Finally, the as machined samples with the rivetless nut plate fastener show a significant increase in life compared to the as machined open-hole specimen life.

This is the first time to our knowledge that anyone has demonstrated a solution to corroded aircraft structures that produces the same or better structural life enhancement, and furthermore, while maintaining acceptable edge distances and adequate torque out values through the use of ultra-thin wall nut plates with adhesives.

Figure 9A:
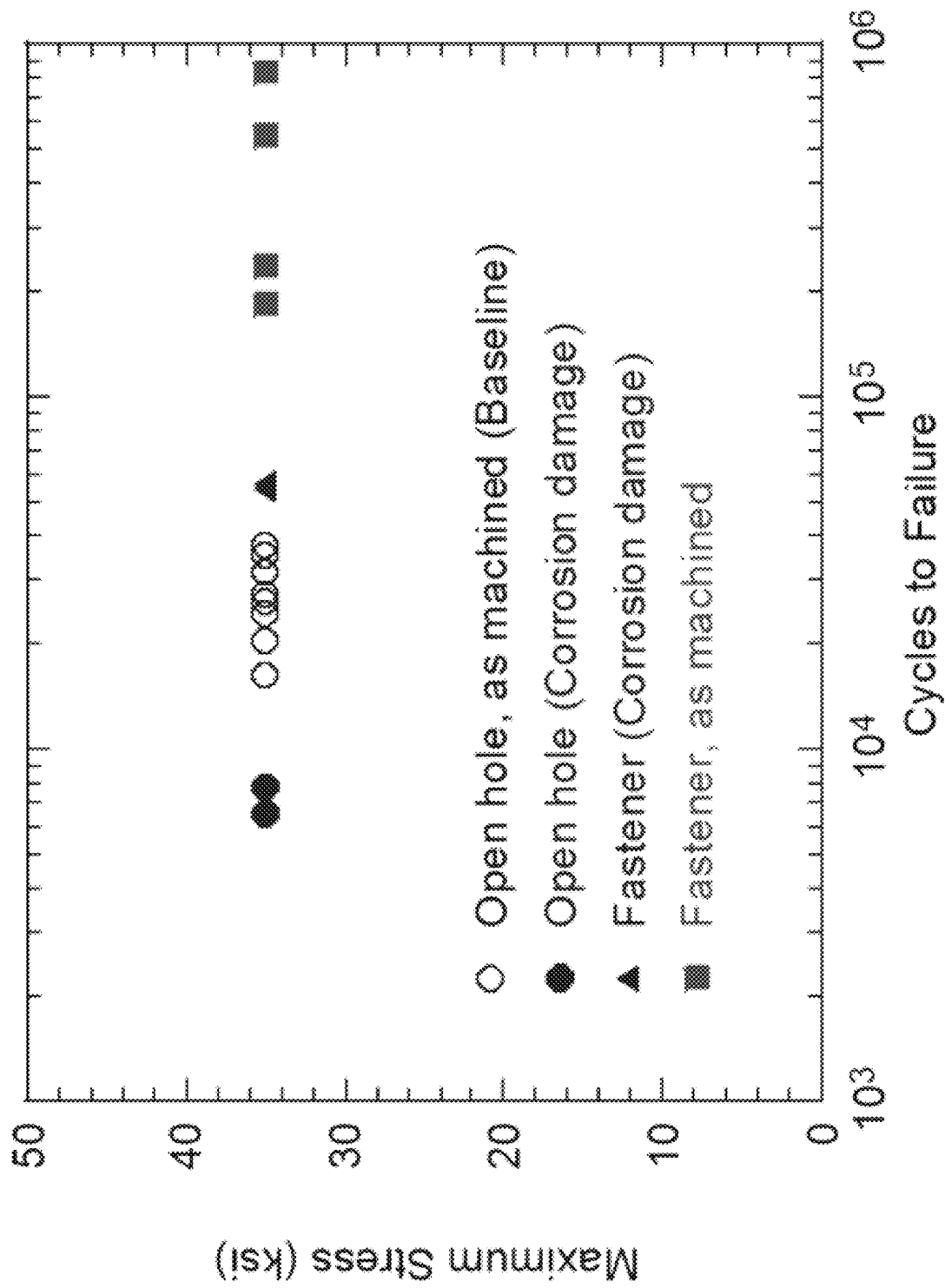
FIG. 9A graphically displays results of several constant amplitude Fatigue Life Tests performed by University of Dayton Research Institute in graphical form, with a constant stress level of 35 KSI.

FIG. 9A graphically displays results of several constant amplitude Fatigue Life Tests performed by University of Dayton Research Institute in graphical form, with a constant stress level of 35 KSI. It can be clearly seen from this graph that the fatigue life of corroded samples, which start at a deficit to new/virgin, open hole samples, after installation of two RNP fasteners actually exceeded the fatigue life of the new/virgin open hole samples in both cases, with nearly identical results, both before and after. This is the first time to our knowledge this significant result has been demonstrated.

Table I below represents the data in FIG. 9A in tabular form. It is clear from this data how consistent the fatigue life results were between the two tests on corroded samples with inserts: 7.66 and 7.82 times improvements versus the fatigue life of corroded open hole samples. This is well above the target improvement of 5 times improvement and as shown in FIG. 9A is enough improvement to exceed the fatigue life of as-new open hole samples.

Spectrum testing was also performed, here using the F-18 wing root bending spectrum. This is derived from millions of flight hours of F-18 fleet usage and is adjusted to represent the 90th percentile of usage severity, as is the standard Navy design practice. This spectrum has the high peak stresses that can negatively affect the life improvement of cold worked holes by exceeding the local yield stress and reducing the compressive residual stress imparted by the cold working process. This is a common problem with short edge distance holes and is one of the reasons we have selected the thin wall concept, to avoid the short edge distance situation.

The table below shows the results of constant amplitude fatigue life testing on two uncorroded samples before and after installation of the fastener (insert). It demonstrates an increase in fatigue life with the 0.010" thin wall fastener of more than five times its original life. This is the first demonstration to our knowledge that thin wall fasteners can still meet or exceed life extension benefits heretofore only available with thicker wall (0.040 and above) fasteners, with all their benefits of improved edge distance, lower net stress, given constant applied load and part weight, and flexible use in composites.

TABLE II

|  | LIFE | AVERAGE | RATIO |
|---|---|---|---|
| Spectrum/Open Hole (s1) | 210,346 | 199,834 | 5.57 |
| Spectrum/Open Hole (s2) | 189,322 | | |
| Spectrum/Insert (s1) | 970,256 | 1,113,228 | |
| Spectrum/Insert (s2) | 1,256,200 | | |

Figure 9B:
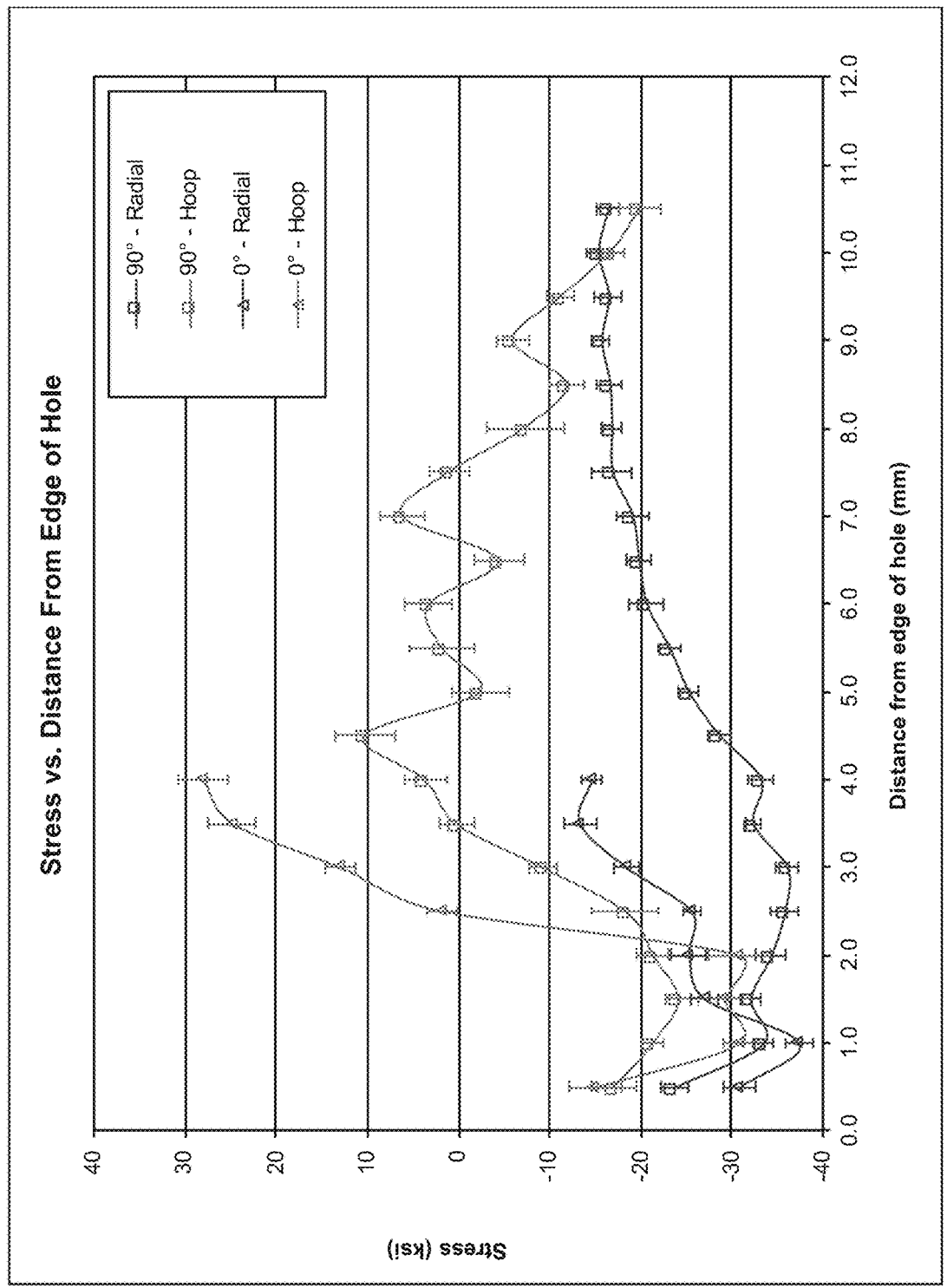
FIG. 9B graphically displays residual hoop and radial stress emanating from the hole at four different orthogonal angles.

FIG. 9B is a graphical display of residual hoop and radial stress emanating from the hole at four different orthogonal angles. This graph significantly demonstrates a similar pattern of stress found in prior art. This is significant because it demonstrates that using a thin walled nutplate provides the same pattern of residual stress in samples as previous generation, thicker walled nutplates. This is significant because residual stress has been shown to be the best proxy for fatigue life, providing further evidence that the thin walled nutplate disclosed herein will produce similar fatigue life benefits as thick walled nutplates without the edge distance limitations. Residual stress typically starts 1 mm from the hole which does enable crack initiation, but provides a "wall" for further cracking starting at the 1 mm radius around the hole. That can be seen in the −20 to −37 KSI stress values at 1 mm distance from the edge of the hole.

Installation Tool 200

Figure 10B:
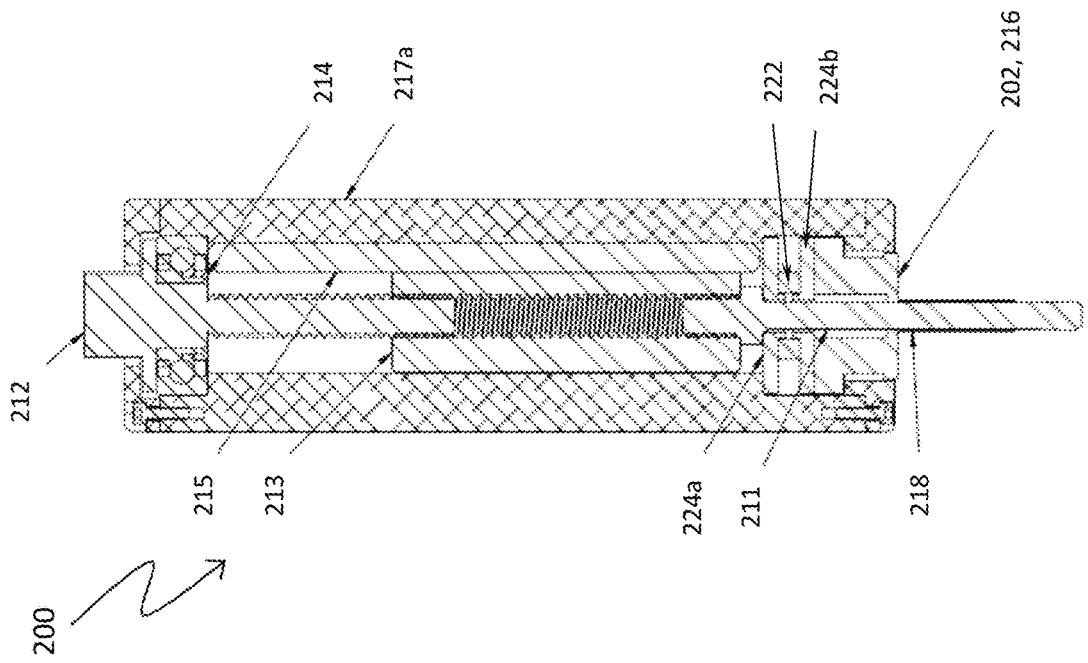
FIG. 10A and FIG. 10B illustrate exploded and cutaway views of a representative embodiment of installation tool 200 of the present disclosure.
Figure 10A:
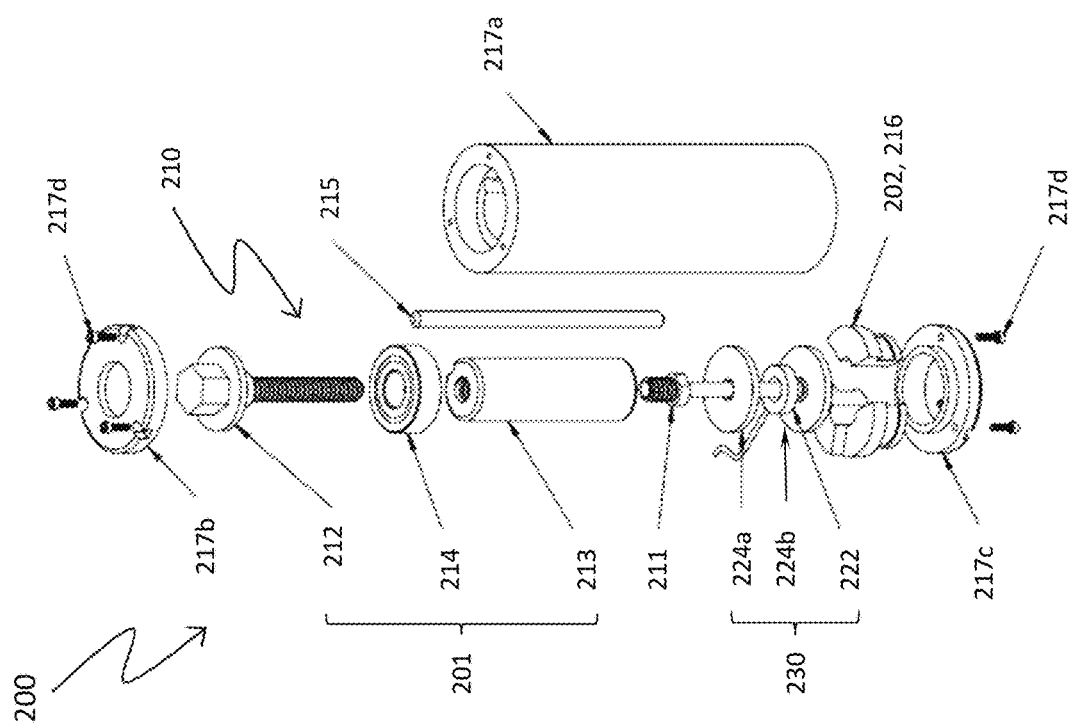

FIG. 10A and FIG. 10B illustrate exploded and cutaway views of a representative embodiment of installation tool 200 of the present disclosure. Installation tool 200 may generally include a pull assembly 210 and a force measurement assembly 220 for installing and measuring applied installation forces, respectively. More specifically, pull assembly 210 may be configured for expanding bushing 120 of fastener 100 within hole 12 of structure 10, and force measurement assembly 220 may be configured for measuring the pull force applied by pull assembly 210 to fastener 100 during installation. As configured, embodiments of installation tool 200 may provide for an easy and efficient, one-step installation process in which installation force is

TABLE I

| UD I.D. # | Parts Works I.D. | Width (in) | Thickness (in) | Outside Hole Dia. (in) | Stress Level (ksi) | Stress Ratio 0.1 (lbf) | | Frequency (Hz) | Start Date | End Date | Cycles | Ratio |
|---|---|---|---|---|---|---|---|---|---|---|---|---|
| | | | | | | Min | Max | | | | | |
| STL563-7 | Corroded/ Open Hole | 1.00000 | 0.24930 | 0.2510 | 35 | 654 | 6535 | 20 | 19 Feb. 2018 | 19 Feb. 2018 | 7,754 | |
| STL563-8 | Corroded/ Open Hole | 0.99750 | 0.25330 | 0.2540 | 35 | 659 | 6591 | 20 | 19 Feb. 2018 | 19 Feb. 2018 | 6,539 | 7.147 |
| STL563-15 | Corroded/ Insert | 1.0037 | 0.2468 | 0.2790 | 35 | 626 | 6260 | 20 | 16 Feb. 2018 | 16 Feb. 2018 | 54,711 | 7.66 |
| STL563-16 | Corroded/ Insert | 1.0008 | 0.2453 | 0.2785 | 35 | 620 | 6202 | 20 | 16 Feb. 2018 | 16 Feb. 2018 | 55,858 | 7.82 (target is 5-10 times) |
| | CORROSION RATIO | | | | | | | | | | Average life Improvement | 7.74 | automatically measured during installation of fastener 100. As later described in more detail, installation tool 200 may be configured to evaluate the measured installation force and provide immediate feedback to a technician as to whether the installation was successful, which can in turn reduce installation and maintenance times, and improve reliability and part lifespan, amongst other benefits. Further, installation tool 200 may record the installation force measurements for each fastener 100 that is installed, and thereby create an auditable record that may be analyzed to improve installation and maintenance protocols, and to reduce the need for supervision over the installation process, amongst other benefits. While installation tool 200 may be described in the context of installing fastener 100 throughout the present disclosure, it should be recognized that installation tool 200 may be used for installing any number of suitable fasteners, such as existing nut plates, on structure 10, particularly those including a component(s) similar to bushing 120 that is configured to be inserted into and expanded within hole 12.

Pull Assembly 210

Pull assembly 210, in various embodiments, may generally comprise a tapered mandrel 211 and a drive mechanism 201 configured to retract mandrel 211 for expanding fastener 100 within hole 12. In the representative embodiment shown, drive mechanism 201 may generally include a lead screw 212 and a threaded screw 213. Generally speaking, lead screw 212 may be turned (e.g., by a impact driver) to drive threaded sleeve 213 for extending and retracting tapered mandrel 211 during the installation process, as later described in more detail. Installation tool 200, in various embodiments, may further include a lead screw bearing 214, a guide rod 215, and mandrel guides 216, all of which may be contained within a housing 217, as described in more detail below.

Threaded sleeve 213 may be configured to travel along a longitudinal axis inside housing 217 during operation. Motion of threaded sleeve 213 may be initiated by turning lead screw 212 in the clockwise or counter-clockwise direction. In reference to FIG. 10A, threaded sleeve 213 may be configured to travel in a first direction (e.g., towards a distal end of installation tool 12, shown here as downwards) if lead screw 212 is turned in the clockwise direction and threaded sleeve 213 may be configured to travel in a second, opposing direction (e.g., towards a proximal end of installation tool 12, shown here as upwards) if the lead screw 212 is turned in the counter-clockwise direction. Lead screw bearing 214 may be located in housing 217 with the purpose of positioning lead screw 212 in alignment with threaded sleeve 213, and thereby providing a smooth rotation of lead screw 212.

Threaded sleeve 213, in various embodiments, may be located within housing 217 by guide rod 215. Guide rod 215 may be stationary inside housing 217 such that it prevents threaded sleeve 213 from spinning about the longitudinal axis of installation tool 200 during operation. Motion of threaded sleeve 213 may be limited in a proximal direction by lead screw bearing 214 at the proximal end of installation tool 200, and limited in a distal direction by first pressure plate 224a.

Attached to a distal end of threaded sleeve 213 is mandrel 211. Mandrel 211, in various embodiments, may be attached to threaded sleeve 213 in such a way that it travels with threaded sleeve 213 in the distal and proximal directions during operation. In various embodiments, one or more mandrel guides 216 (three shown) may be provided in a distal section of installation tool 200. Mandrel guides 216 may be configured to work together to allow mandrel 211 to enter and exit the distal end of installation tool 200 during operation. Housing 216 may include end caps 216b, 216c configured for positioning on the distal and proximal ends of housing body 216a, respectively. End caps 216b, 216c may be configured to contain the aforementioned internal components within housing body 216a and may be held in place by one or more retention bolts 216d.

Force Measurement Assembly 220

Force measurement assembly 220, in various embodiments, may generally comprise a force sensor 222 (e.g., a load cell) and a free-floating component 202. In the representative embodiment shown, mandrel guides 216 serve as free-floating component 202, though one of ordinary skill in the art will recognize other free-floating components suitable for functioning in the presently described manner without departing from the scope of the present disclosure.

Generally speaking, in various embodiments, force sensor 222 may be situated inside of housing 217 adjacent to free-floating component 202, and free-floating component 202 (e.g., mandrel guides 216) may extend partially beyond the distal end of housing 217 (i.e., beyond cap 217c). As configured, when mandrel 211 is retracted into housing 217, the force used to pull mandrel 211 will be transferred from pull assembly 210 to force measurement assembly 220. In particular, during the installation process, the portion of mandrel guides 216 extending from the distal end of housing 217 contact structure 10 in which fastener 100 is being installed, and thus mandrel guides 216 assume the pressure generated between installation tool 200 and structure 10 when mandrel 211 is retracted by pull assembly 210 to expand bushing 210. Mandrel guides 216, in turn, transfer the applied pressure to the adjacent force sensor 222. In an embodiment, load cell 211 may be configured to measure pressures between about 0 pounds to about 10,000 pounds and thereby accommodate a variety of installations.

Force measurement assembly 220, in various embodiments, may further include one or more components 224 configured for uniformly distributing installation forces onto load cell 210. In a representative embodiment, these optional components may include one or more pressure plates 224 positioned between load cell 210 and components of pull assembly 210, so as to receive forces associated with the pull of mandrel 211 and distribute them evenly onto force sensor 222 in a perpendicular direction. For example, in the embodiment shown, first and second pressure plates 224a, 224b may be positioned on opposing sides of force sensor 222. More specifically, first pressure plate 224a may be situated between a proximal side of force sensor 222 and a flange extending inwards within housing body 217a as shown, and second pressure plate 224b may be situated between a distal side of force sensor 222 and free-floating component 202 (e.g., mandrel guides 216). As configured, mandrel guides 216 assume the pressure generated between installation tool 200 and structure 10 when mandrel 211 is retracted by pull assembly 210 to expand bushing 210, and transfer the applied pressure to second pressure plate 224b. In turn, second pressure plate 224b distributes the transferred force to the distal side of force sensor 222. First pressure plate 224a, as positioned against the proximal side of force sensor 222, effectively acts a flat backstop against which second pressure plate 224b sandwiches force sensor 222, and thereby works in concert with second pressure plate 224b to further help distribute the applied forces uniformly and perpendicularly against force sensor 222. In various embodiments, mandrel guides 216, pressure plates 224a, 224b, and force sensor 222 may be free floating inside housing 217 and are retained in housing 217 by the bottom cap 217c. The term "free floating" refers to the fact that these parts are manufactured to have a smaller outer diameter than the inner diameter of housing body 217a, such that these parts may move as needed within housing 217 to provide a uniform and perpendicular force on force sensor 222.

Figure 11A:
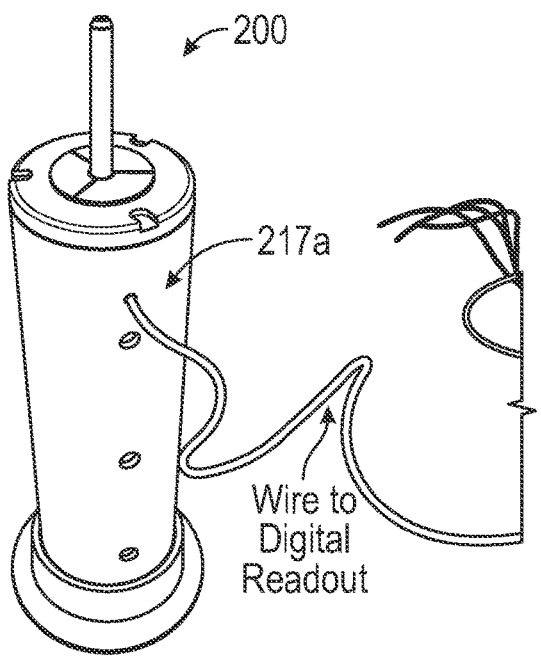
FIG. 11A depicts force sensor 222 connected to a digital read out device configured to record pressure measurements throughout the installation process.

Referring now to FIG. 11A, force sensor 222, in various embodiments, may be connected to a digital read out device configured to record pressure measurements throughout the installation process. In an embodiment, a wired connection may be made by running a wire connecting force sensor 222 and the digital read out device through the side of housing body 217a, as directly to the digital read out device, as shown. In another embodiment, the digital readout is a screen embedded in the tool.

Figure 11B:
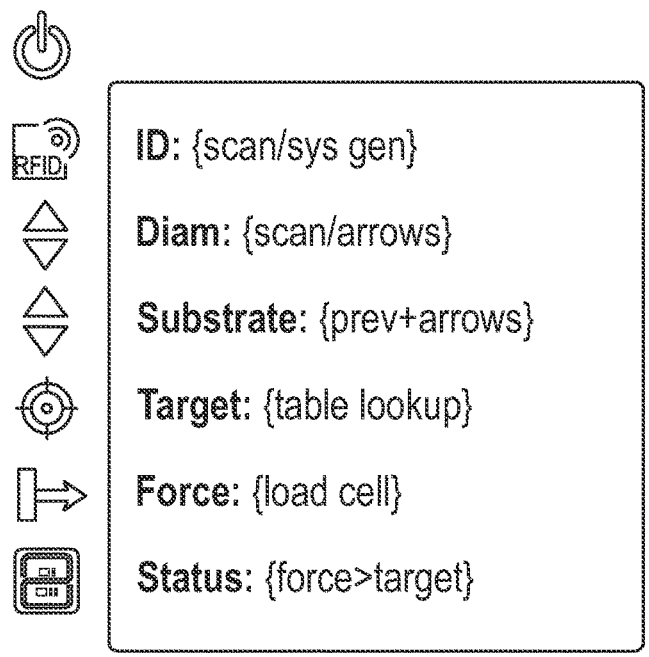
FIG. 11B, FIG. 11C illustrate the digital readout device, in various embodiments, may record pressure measurements several times per second (e.g., at least 60 times per second) so as to accurately capture one or both of a maximum and total force applied by installation tool 200 to fastener 100 during installation.
Figure 11C:
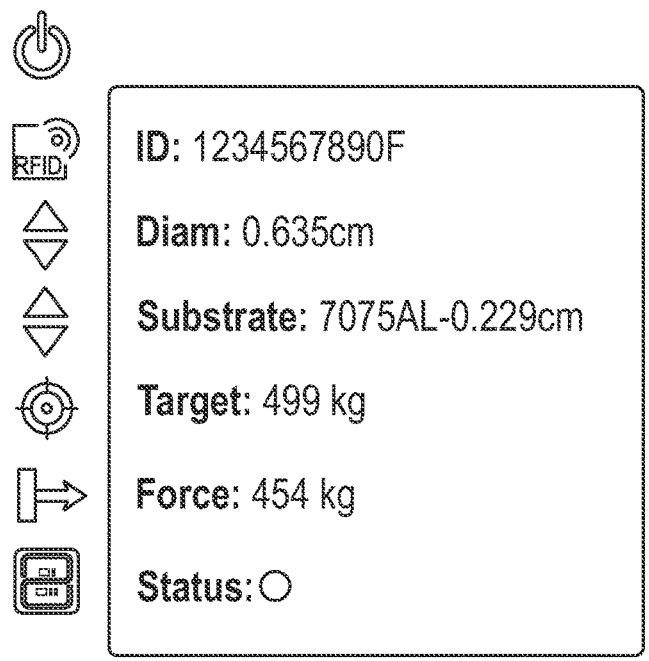
Figure 11D:
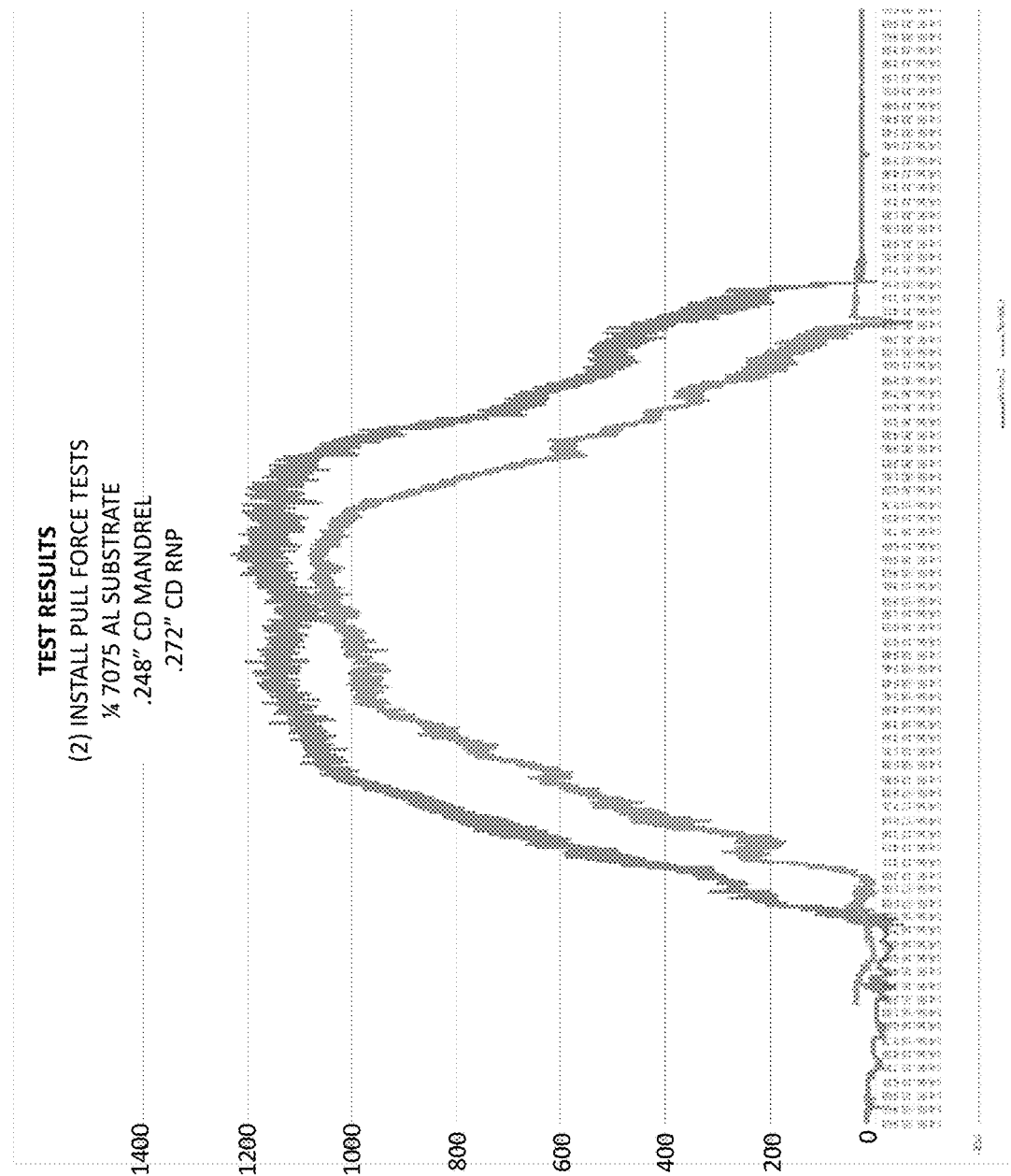
FIG. 11D illustrates total area under the curve of all the force applied during installation.

Referring now to FIG. 11B and FIG. 11C, the digital readout device, in various embodiments, may record pressure measurements several times per second (e.g., at least 60 times per second) so as to accurately capture one or both of a maximum and total force applied by installation tool 200 to fastener 100 during installation. In an embodiment, the digital readout device may sample the applied force at a rate between about 50 Hz to about 999 Hz. From the pressure measurements recorded on the digital read out device, a pass/fail determination can be made in regards to the installation. For example, the digital readout device may be programmed with an acceptable range of forces within which the installation of fastener 100 is considered successful, and outside of which the installation is considered unsuccessful. Depending on the particular application and circumstances, the digital readout device may compare the maximum measured force against a range of maximum forces considered acceptable for a successful installation, and/or may compare the total force (i.e., (total area under the curve of all the force applied during installation, as shown in FIG. 11D) recorded by force sensor 222 throughout installation against a range of total forces considered acceptable for a successful installation. The criteria used in determining acceptable ranges of forces for a pass/fail determination may include, without limitation, one or a combination material characteristics of structure 10 (e.g., type, grade), the dimensions of structure 10 (in particular, thickness), and the size of fastener 100 (in particular, wall thickness 126 of bushing 120 thereof), amongst others. To that end, digital readout device may be provided selector buttons or another suitable interface that allows a technician using installation tool 200 to select these criteria, as shown in FIG. 11B and FIG. 11C. For example, this interface may allow the technician to select material type of structure 10 (e.g., aluminum, steel, titanium, and grades thereof), thickness of structure 10 (e.g., 0.040, 0.060, 0.090, 0.100, 0.125, 0.188, 0.250), and diameter of fastener 100 (e.g., #6, #8, #10, 1/8, 3/16, 1/4, 5/16, 3/8, 7/16, 1/2).

The digital readout device, in various embodiments, may automatically provide a visual, audible, tactile, or other form of notification to the technician using installation tool 200 as to whether the measured installation force fell within the acceptable range (i.e., pass/fail). For example, digital readout device may present a pass/fail message on its screen, or a light may illuminate (e.g., green for successful, red for failure) and/or blink (e.g., blink for successful, solid for failure) to indicated whether the installation passed or failed. Additionally or alternatively, the digital readout device may produce an audible notification indicative of pass/fail, such as a single beep for pass and multiple successive beeps for failure. Still further, the digital readout device may additionally or alternatively provide a tactile indication of pass fail, such as a short vibration for pass and multiple successive vibrations for failure.

Representative Installation Process

Figure 12B:
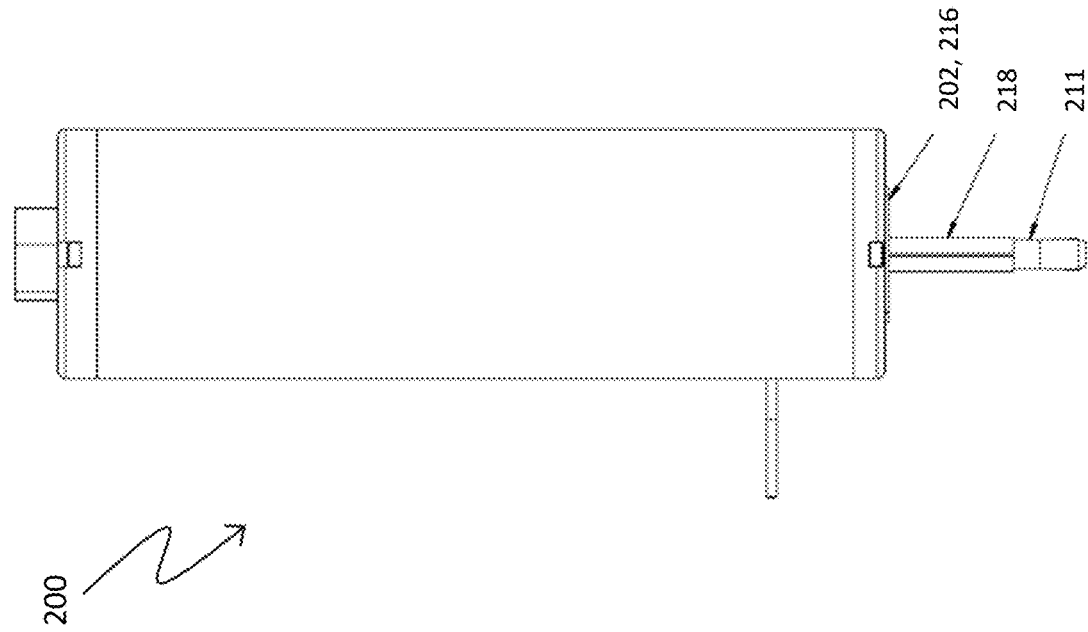
FIG. 12A, FIG. 12B, FIG. 12C, FIG. 12D, FIG. 12E, FIG. 12F, and FIG. 12G depict various steps of a representative process for installing fastener 100 with installation tool 200.
Figure 12A:
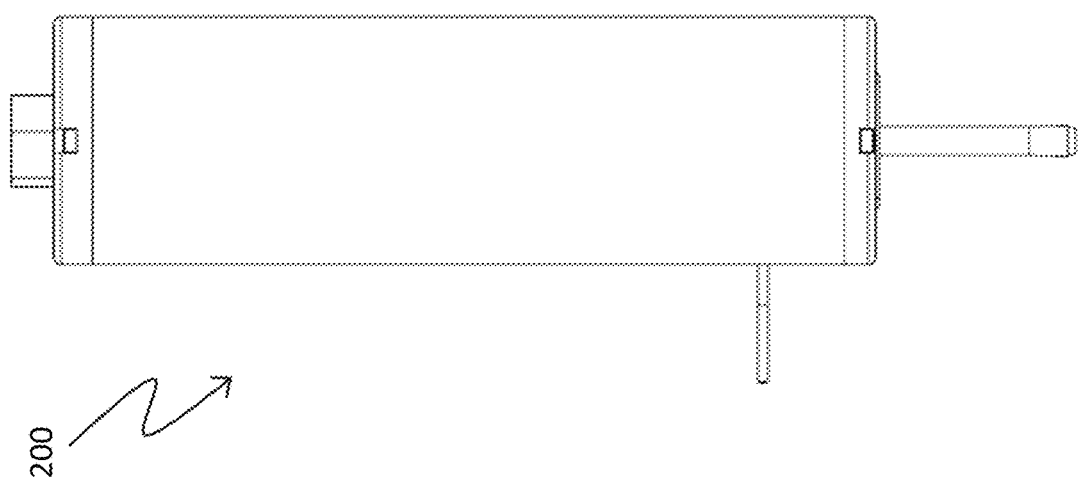
Figure 12C:
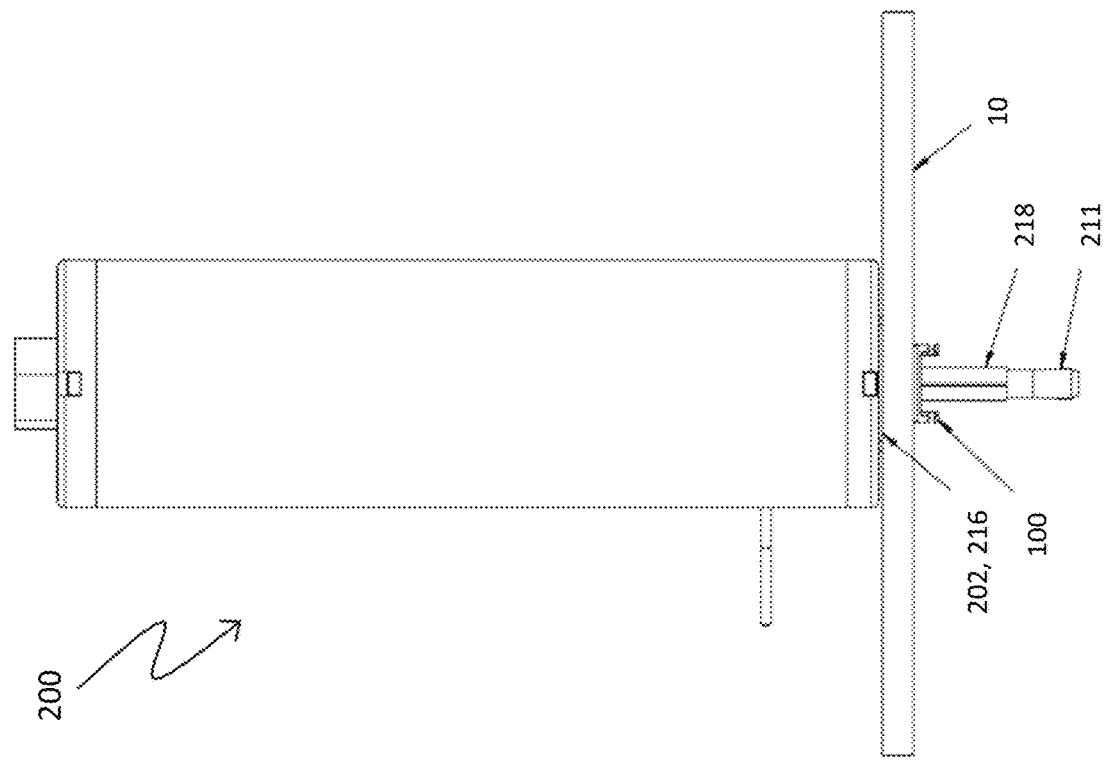
Figure 12D:
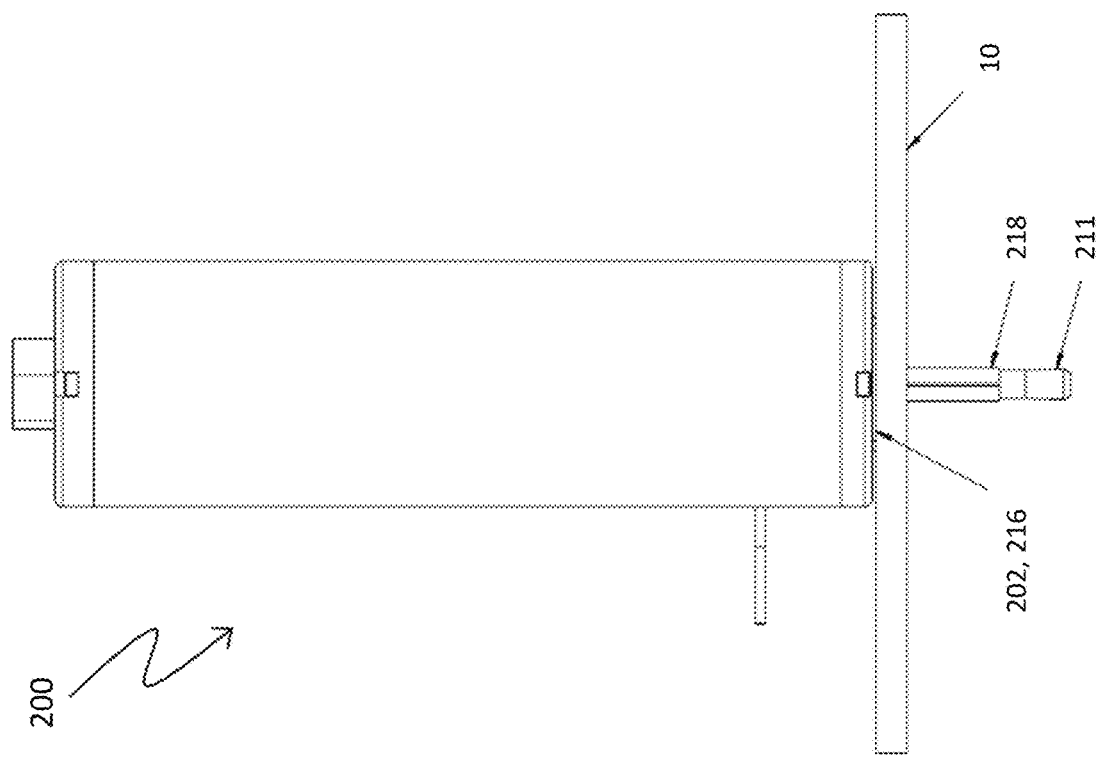

FIG. 12A, FIG. 12B, FIG. 12C, FIG. 12D, FIG. 12E, FIG. 12F, and FIG. 12G depict various steps of a representative process for installing fastener 100 with installation tool 200. FIG. 12A displays the tool in its fully extended state, ready to begin the installation process. Next, as shown in FIG. 12B, split sleeve 218 may be positioned over mandrel 211. Split sleeve 218, in an embodiment, may be manually attached to the outer diameter of mandrel 211 by sliding split sleeve 218 over the distal end of mandrel 211 and positioning split sleeve 218 so that a proximal end of split sleeve 218 is in contact with mandrel guides 216. Referring now to FIG. 12C, mandrel 211 (with split sleeve 218 thereon) may be inserted into hole 12 in structure 10. Installation tool 200 may be positioned so that mandrel guides 216 are in contact with the surface of substrate 10 surrounding hole 12. Next, as shown in FIG. 12D, fastener 100 may be positioned in hole 12 such that inner surface 124 (not shown) is positioned about split sleeve 218 on mandrel 211. More specifically, fastener 100, in an embodiment, may be slid, bushing 120-first, over mandrel 211 and split sleeve 218, and towards hole 12 until bottom surface 112 (not shown) contacts the surface of structure 10 surrounding hole 12, as shown.

Figure 12F:
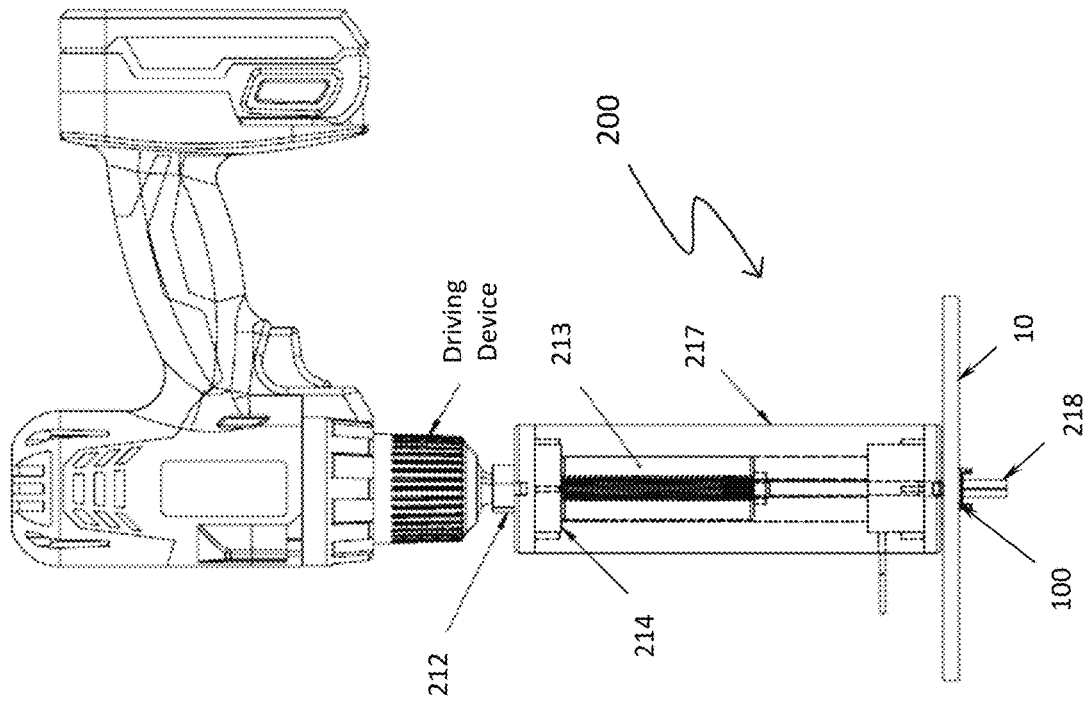
Figure 12E:
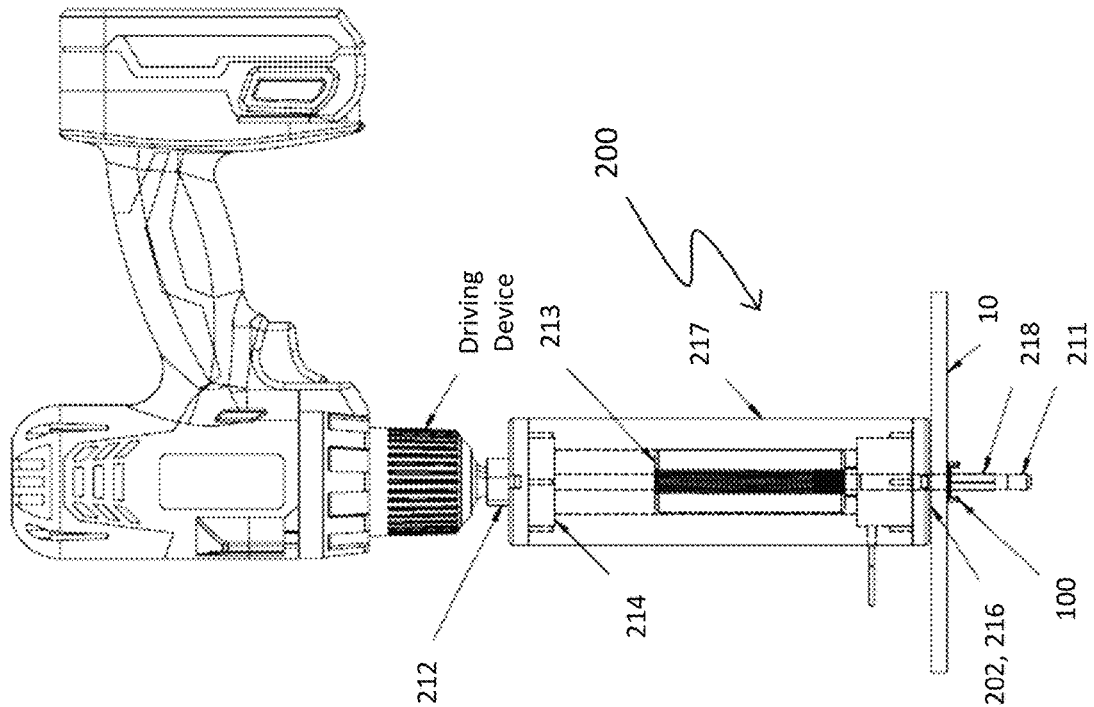
Figure 12G:
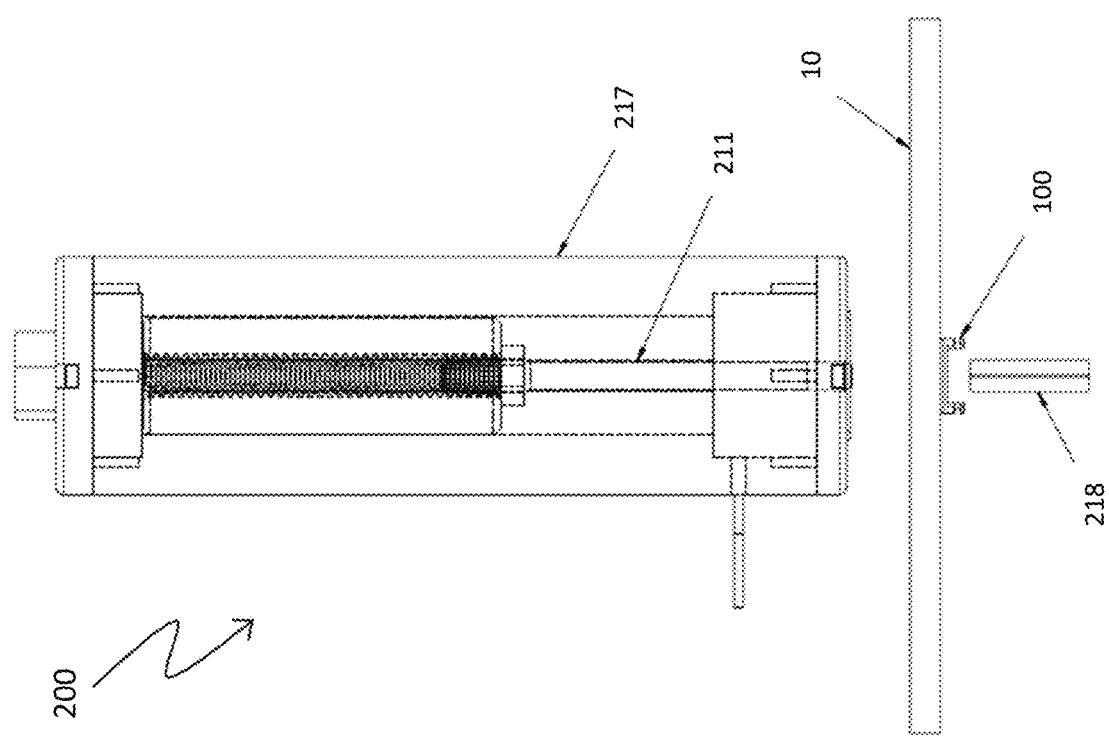

Referring now to FIG. 12E, a driving device (e.g., pneumatic, hydraulic, battery powered or manual), such as the impact driver shown, may be attached to the head of lead screw 212 at a proximal end of installation tool 200. Of course, in some embodiments, installation tool 200 may further include an integrated drive device, such as an electric motor and any necessary gearing, for driving drive mechanism 201. Next, as shown in FIG. 12F, the driving device may then be activated to turn lead screw 212 in a clockwise or counter-clockwise direction. The clockwise rotation of lead screw 212 pulls threaded sleeve 213 towards the proximal end of installation tool 200, causing mandrel 211 to be retracted into housing 217. Mandrel 211 may be threaded into the distal end of threaded sleeve 213 and therefore travels the same distance and direction as threaded sleeve 213. During this installation step, split sleeve 218, fastener 100, and structure 10 remain stationary and mandrel guide 216 remains in contact with structure 10. As threaded sleeve 213 travels in the proximal direction and mandrel 211 retracts into housing 217, split sleeve 218 positioned about mandrel 211 contacts mandrel guides 216 and is held in a stationary position until mandrel 211 has fully retracted into housing 217. Retraction of tapered mandrel causes bushing 120 of fastener 100 to expand within hole 12, thereby coldworking hole 12 and creating a friction fit between bushing 120 and hole 12 or an enhanced bond via adhesive 130, as previously described. After the driving device has turned lead screw 212 until threaded sleeve 213 makes contact with lead screw bearing 214, the driving device is deactivated. Referring now to FIG. 12G, with fastener 100 securely installed within hole 12, mandrel 211 may be fully retracted into housing 217, and split sleeve 218 can be manually removed from inside fastener 100.

Force Measurement Adapter 300 for Existing Pullers

Figure 13A:
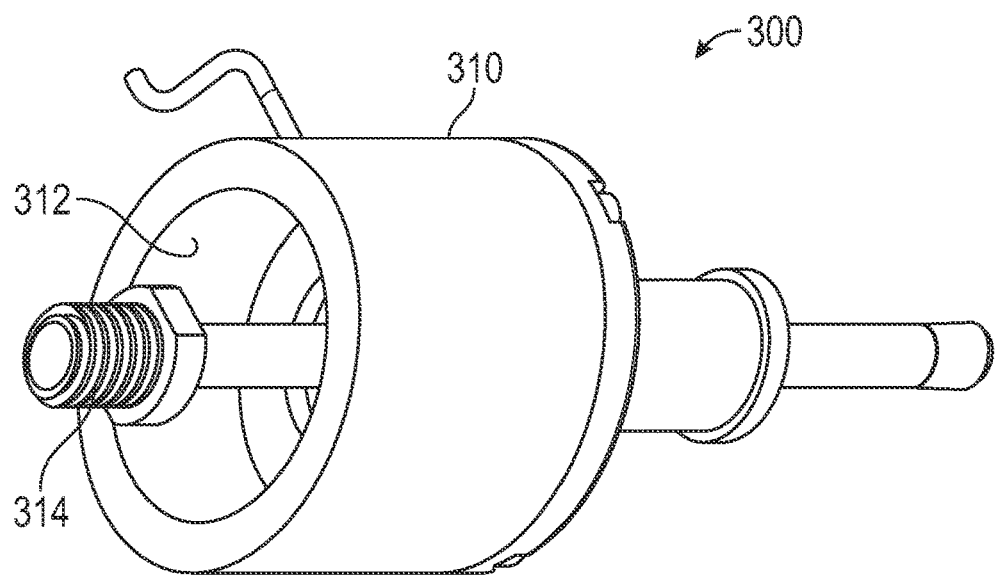
FIG. 13A and FIG. 13B illustrate perspective and cutaway views of a representative embodiment of a force measurement tool 300 for measuring a force associated with installing fastener 100 and/or expanding hole 12.
Figure 13B:
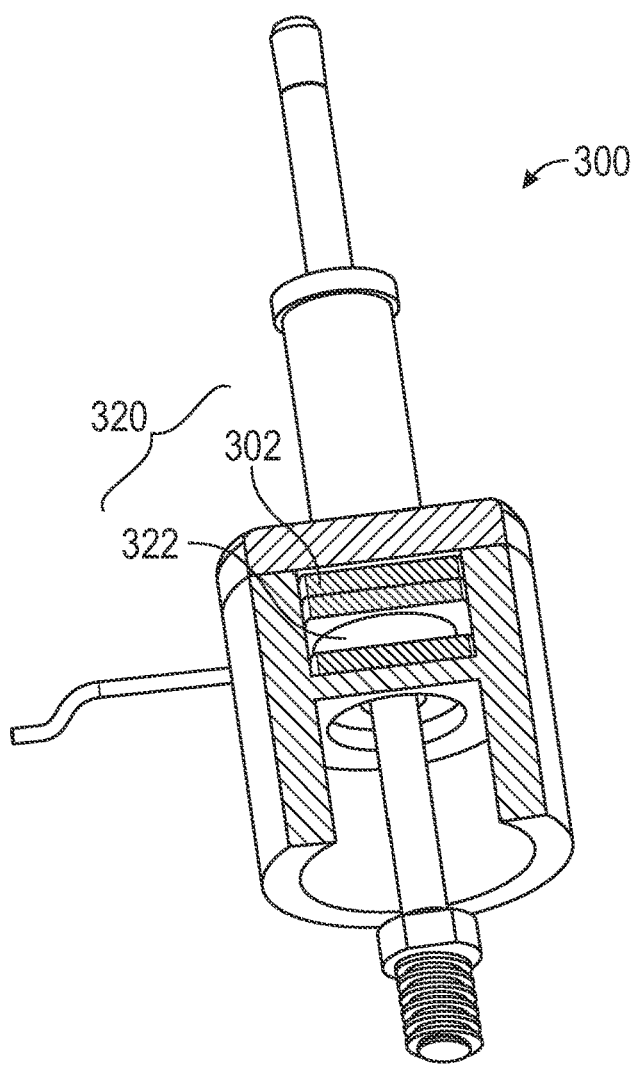

FIG. 13A and FIG. 13B illustrate perspective and cutaway views of a representative embodiment of a force measurement tool 300 for measuring a force associated with installing fastener 100 and/or expanding hole 12 (e.g., during a coldworking process). Unlike installation tool 200 which includes components for both pulling a mandrel and measuring installation and/or coldworking forces, force measurement tool 300, in various embodiments, may be configured to be installed on and measure such forces generated by existing pullers. Accordingly, installation tool 300 may at times be referred to as "adapter 300." Adapter 300 may generally include an adapter assembly 310 configured for coupling with a puller 400, and a force measurement assembly 320 similar to that of installation tool 200.

Adapter assembly 310, in various embodiments, may include an adapter 312 that is shaped and dimensioned for coupling with a nose or similar distal portion 410 of a traditional puller 400, as later shown and described in more detail with respect to FIG. 14A, FIG. 14B and FIG. 14C. Adapter assembly 310 may additionally include a mandrel adapter 314 which, in various embodiments, may replace the mandrel that may ordinarily be included with or attached to traditional mandrel 400. In particular, mandrel adapter 314 may include a mandrel having a proximal end dimensioned and shaped for coupling with a mandrel receiver 414 of traditional puller 400, as later shown and described in more detail with respect to FIG. 14A, FIG. 14B and FIG. 14C. These components of adapter assembly 310 combine with puller 400 to pull mandrel 314 through hole 12 to coldwork the hole and/or expand fastener 100, similar to pull assembly 210 of installation tool 200.

Force measurement assembly 320, in various embodiments, may include a force sensor 322 and a free-floating component 302 as shown in FIG. 13B. These components may be positioned and arranged to function similar to force sensor 222 and free floating component 202 of installation tool 200. That is, when adapter 300 is installed on puller 400, and puller 400 operated to pull the mandrel, free-floating component 302 applies an axial force against force sensor 322 and thereby measures the associated force of the installation and/or coldworking operation. While not shown, force measurement assembly 320 of adapter 300, in some embodiments, may further include [plates] similar to those of force measurement assembly 220.

It should be appreciated that the description of various components of force measurement assembly 220 of installation tool 200, and their corresponding arrangements and functionalities, are hereby incorporated and adapted for use in force measurement assembly 320. Further, adapter 300 may be connected to a digital read out device configured to record pressure measurements throughout the installation process, similar to that described in association with installation tool 200.

Figure 14A:
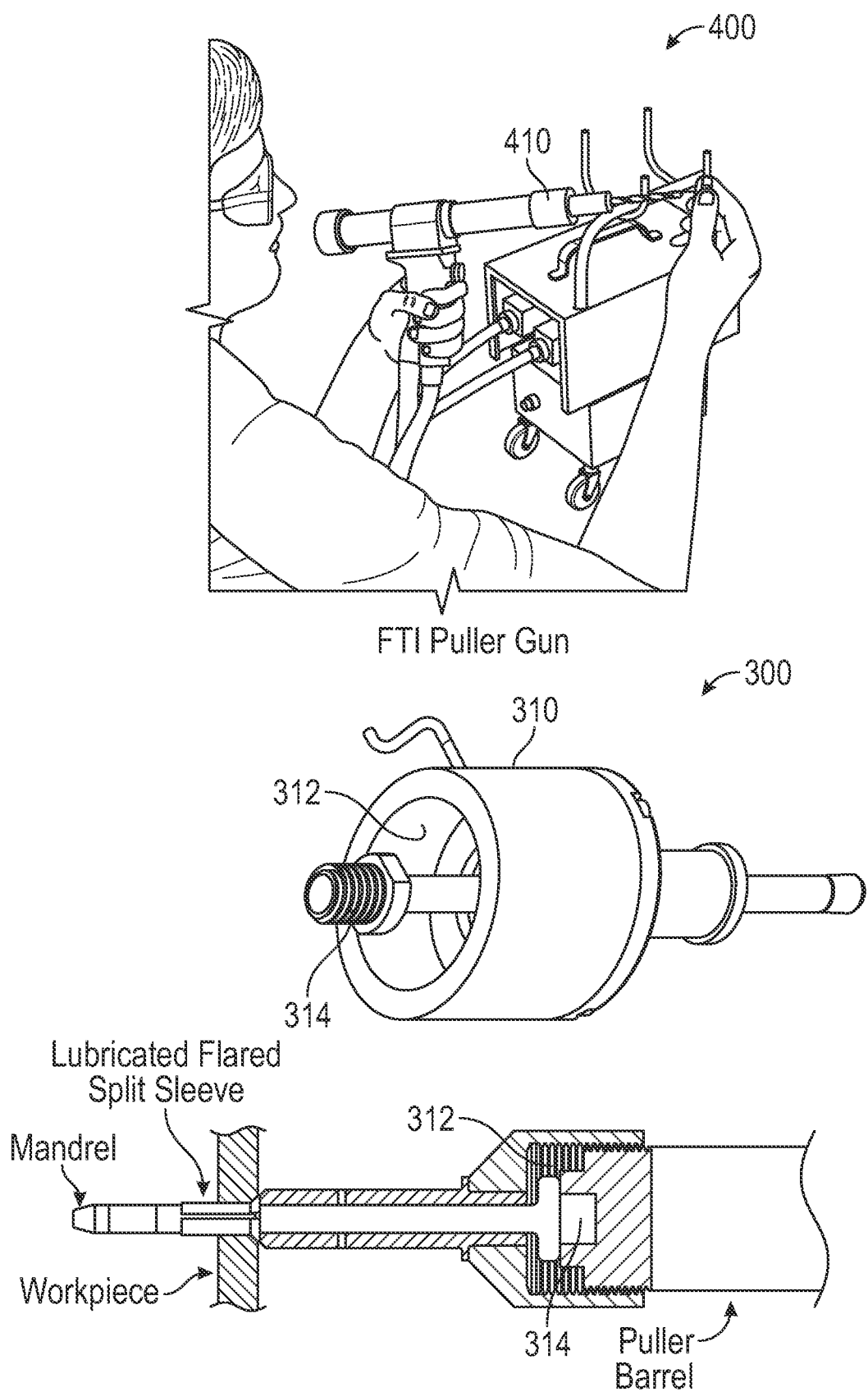
Figure 14B:
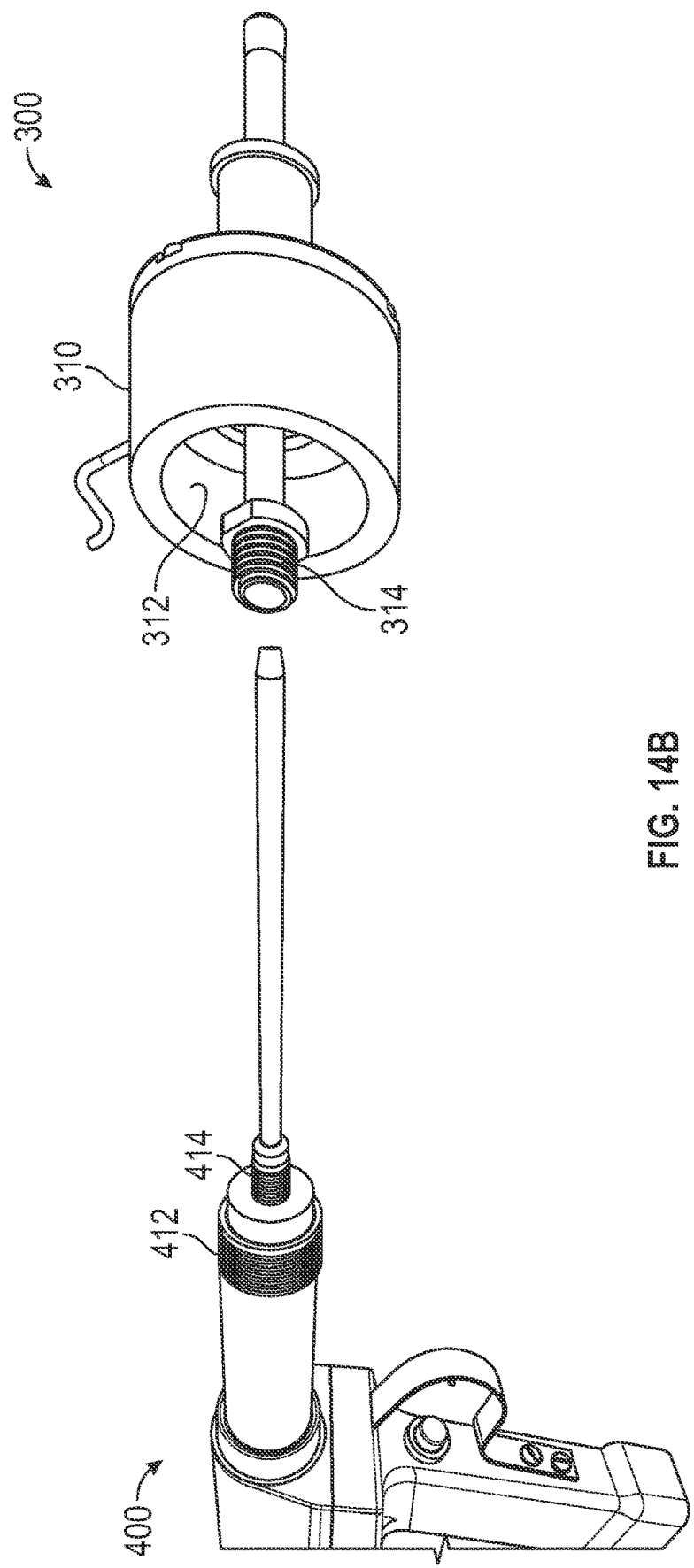

FIG. 14A, FIG. 14B and FIG. 14C illustrate schematic views of adapter 300 configured for use with various existing pullers 400. For example, FIG. 14A illustrates a housing adapter 300 configured for installation on a Fatigue Technology (FTI) puller gun. Adapter assembly 310 may be positioned and secured to a nose 410 of the FTI puller gun 400. In particular, mandrel adapter 314 may be externally threaded such that it may be screwed into an internally threaded mandrel receiver 414 of the FTI puller gun 400, and housing adapter 312 may be dimensioned for a friction fit on nose 410 of the FTI puller gun 400. As configured, when the FTI puller gun 400 is activated, the mandrel of adapter 300 is pulled through the hole and/or fastener and force measurement assembly 320 measures the associated force.

As another example, FIG. 14B illustrates an adapter 300 configured for installation on a West Coast Industries (WCI) puller gun. Adapter assembly 310 may be positioned and secured to a nose of the WCI puller gun 400. In particular, mandrel adapter 314 may be externally threaded such that it may be screwed into an internally threaded mandrel receiver 414 of the WCI puller gun 400, and housing adapter 312 may be internally threaded such that it may be screwed onto external threads 412 on the nose of the WCI puller gun. As configured, when the WCI puller gun 400 is activated, the mandrel of adapter 300 is pulled through the hole and/or fastener and force measurement assembly 320 measures the associated force.

In yet another example, FIG. 14C illustrates an adapter 300 configured for installation on a Fastening Systems International (FSI) puller gun. Adapter assembly 310 may be positioned and secured to a sleeve 410 of the FSI puller gun 400. In particular, mandrel adapter 314 may be externally threaded such that it may be screwed into an internally threaded extended straight pulling head 414 of the FSI puller gun 400, and housing adapter 312 may be internally threaded such that it may be screwed onto external threads 412 of an adjustable adapter shaft of the FSI puller gun. As configured, when the FSII puller gun 400 is activated, the mandrel of adapter 300 is pulled through the hole and/or fastener and force measurement assembly 320 measures the associated force.

Tracking Pull Force Measurements Across Structure 10

Installation tool 200 and adapter 300, in various embodiments, may be configured for associating pull force measurements with the location of each corresponding fastener 100 installed in structure 10. As configured, installation tool 200 and adapter 300 may provide an auditable record of pull forces imparted to the various fasteners 100 in a given structure 10.

In particular, by associating each pull force with the location of each corresponding fastener, installation tool 200 and adapter 300 may provide for identifying specific fasteners 100 that may require further action. For example, consider a situation in which fasteners were considered successfully installed within a given range of forces, but after future inspection it was determined that the upper end of the range was too high, as many of the fasteners exhibited bushing 120 damage and subsequently fell out. In such a situation, it may be beneficial to identify which remaining fasteners 100 were installed at forces above that threshold where damage occurred, so that such remaining fasteners could be repaired or replaced.

Additionally or alternatively, by associating each pull force with the location of each corresponding fastener, installation tool 200 and adapter 300 may provide for determining adjustments for future installations. For example, consider a structure 10 in certain fasteners 100 or associated holes 12 seemed to exhibit problems (e.g., fasteners torquing out, or higher than normal cracks/corrosion around hole). In such a situation, maintenance personnel may be able to analyze the auditable record of pull forces provided by installation tool 200 to identify the portions of structure 10 (and similar structure on the same vehicle or other vehicles in a fleet) affected by the issue (whether it be due to increased loads on structure 10 in that location or something else), and revise the range of acceptable pull forces at those locations for immediate maintenance or future installations on similar vehicles in the fleet.

Figure 15A:
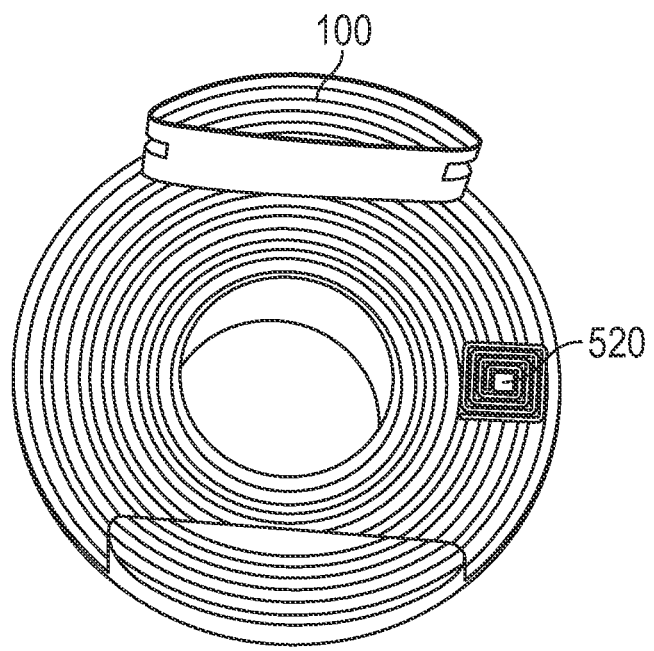
FIG. 15A, FIG. 15B, and FIG. 15C depicts an installation tool 200 and adapter 300 provided with a radio frequency identification (RFID) reader, barcode reader, or similar device 510 configured to scan an RFID tag, barcode, or similar identifier 520 associated with each fastener 100, structure 10, and/or hole 12, depending on the particular embodiment.
Figure 15B:
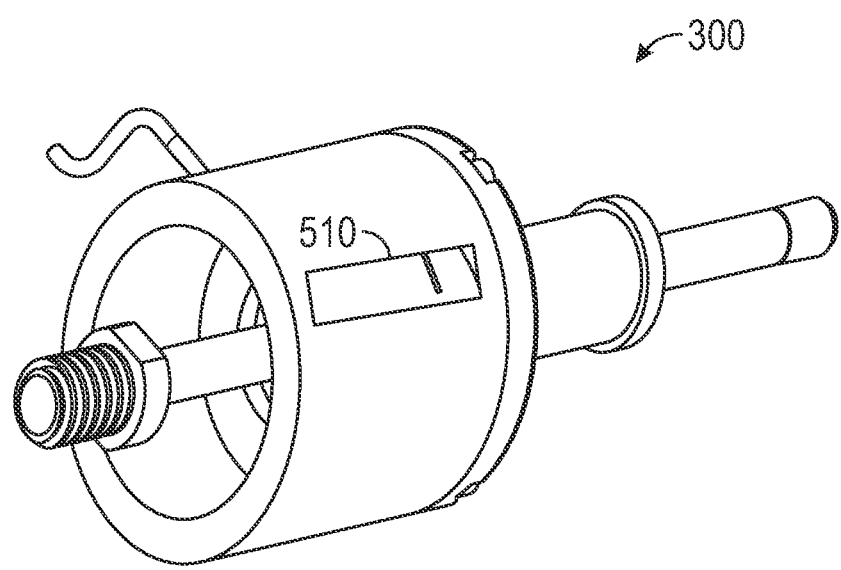
Figure 15C:
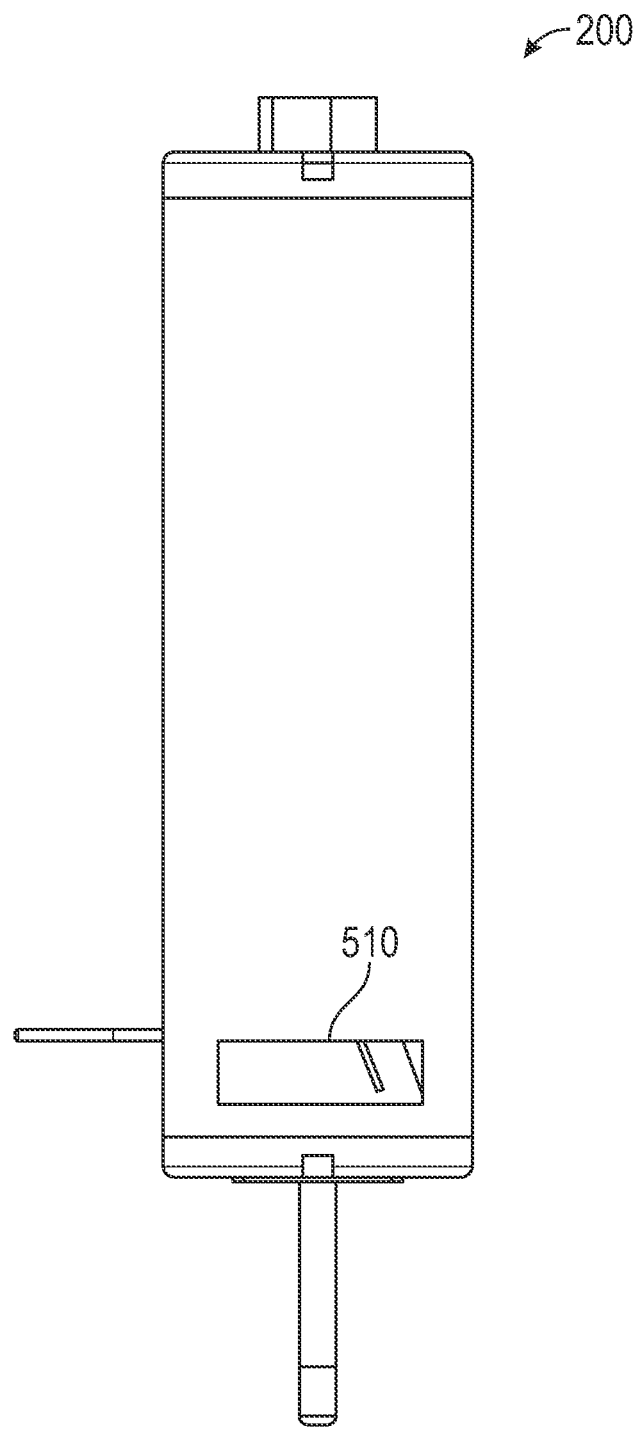

To that end, with reference now to FIG. 15A, FIG. 15B, and FIG. 15C, installation tool 200 and adapter 300, in various embodiments, may be provided with a radio frequency identification (RFID) reader, barcode reader, or similar device 510 configured to scan an RFID tag, barcode, or similar identifier 520 associated with each fastener 100, structure 10, and/or hole 12, depending on the particular embodiment. For the sake of simplicity, and without intending to limit the present disclosure, these embodiments will be described in the context of RFID technology only, with installation tool 200 including an RFID reader 510 and each fastener 100, structure 10, and/or hole 12 including a passive RFID tag 520. In a representative embodiment, each fastener 100 may be provided with a unique RFID tag 520 that is scanned by the RFID reader 510 on adapter 300 (FIG. 15B) or installation tool 200 (FIG. 15C) at the time each particular fastener is installed. To improve the efficiency of installation, and/or to avoid accidentally forgetting to scan the RFID tag 520 on one or more fasteners 100, the RFID reader 510 may be configured to scan the RFID tag 520 during the installation of each fastener 100. For example, installation tool 200 and adapter 300 may be programmed such that powering the drive device to pull mandrel 211 also serves to automatically activate RFID reader 510 at the same time. As configured, the RFID reader 510 of installation tool 200 would be positioned close to the RFID tag 520 of the particular fastener 100 being installed, and thus could read the identification of that particular RFID tag 520 while not reading the identifications stored on the RFID tag 520s of fasteners installed nearby or awaiting installation (e.g., in a bin carried by the technician). To that end, in an embodiment, RFID reader 510 may be positioned near the distal end of installation tool 200 or adapter 300, as shown, so as to minimize a distance during the installation process between the RFID reader 510 and the RFID tag 520 of a fastener 100 being installed. The RFID tag 520 could be situated in any suitable location on fastener 100, and in an embodiment, may be implanted in a cavity on the face of fastener 100.

The RFID reader 510, in an embodiment, may have a wired connection to the digital readout device or other electronic system storing pull force measurements and associated locations (e.g., a computer, paired mobile device, etc.), while in another embodiment, RFID reader 510 may be in wireless communication with such systems (e.g., via Bluetooth, Zigbee or other wireless protocols). In addition or alternative to remotely storing pull forces, pass/fail indications, and other relevant parameters for each installation, installation tool 200 or adapter 300, in an embodiment, may be configured to write the measured pull force and associated information to the RFID tag 520 on the corresponding fastener 100.

Figure 16A:
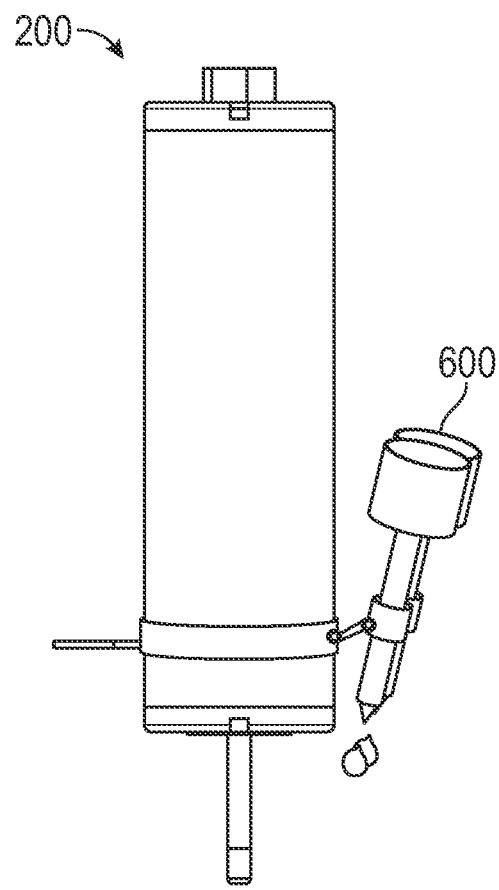
FIG. 16A and FIG. 16B illustrates an installation tool 200 or adapter 300 equipped with a device 600 for automatically marking structure 10 near fastener 100 (or fastener 100 itself) with at least an indication of whether the installation passed or failed.
Figure 16B:
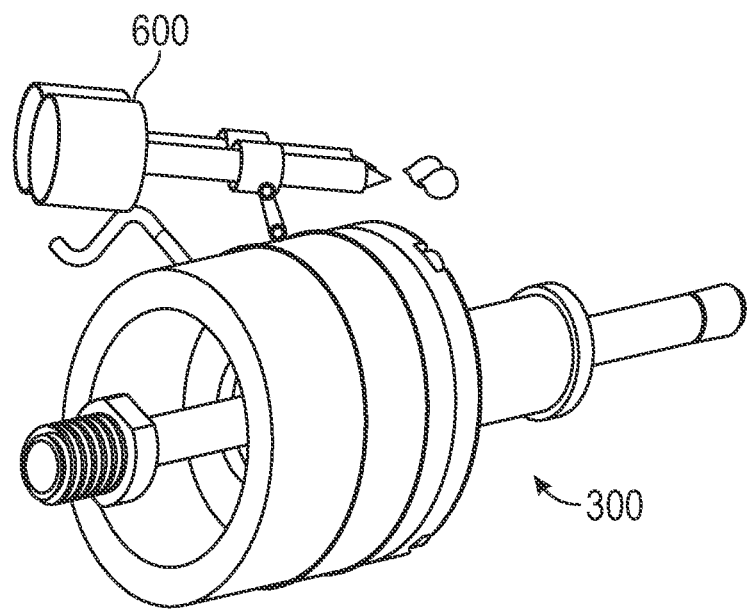

Similarly, with reference now to FIG. 16A and FIG. 16B, installation tool 200 or adapter 300, in an embodiment, may be equipped with a device 600 for automatically marking structure 10 near fastener 100 (or fastener 100 itself) with at least an indication of whether the installation passed or failed. For example, installation tool 200 or adapter 300 may include a spraying device 600 near its distal end that is configured to automatically spray a green dot or a red dot nearby hole 12 if the installation passed or failed, respectively. While spraying device 600 is shown as an external attachment, it should be recognized that spray device 600 may be integrated internally within installation tool 200 or adapter 300. Further, an extendible ink pen or other such marking device may be substituted for spraying device 600 in various embodiments. In the event an installation failed, the technician could come back to those fasteners marked with red dots and repair/replace each if warranted by visual or other inspection. Additionally or alternatively, the technician could leave the failed fastener installation(s) as-is, and maintenance personnel could pay particular attention to fasteners 100 marked with red dots when performing structural inspections.

As configured with RFID reader 510 and RFID tags 520, engineers could analyze the associated auditable record of pull forces, and technicians could locate those fasteners needing repair, replacement, or inspection by scanning the RFID tags 520 of installed fasteners 100 in structure 10. In various embodiments, structure 10 may additionally or alternatively be provided with an RFID tag 520, such that a technician may more easily locate the particular structure containing specific fasteners 100. In an embodiment, technicians could follow a particular path and order for installing fasteners 100 (e.g., defining a consistent starting point and working away from there in a consistent pattern), and thereby facilitate efforts to locate specific fasteners 100 requiring maintenance on structure 10.

Additionally or alternatively, installation tool 200 or adapter 300, in various embodiments, may be configured to track the exact location of each fastener 100 installed in structure 10 may be tracked and store it with the associated pull force. In one such embodiment, a projection system may be used to project light beams to indicate where holes 12 should be drilled on structure 10 during a new build. In particular, the projection system may utilize a 3D model of structure 10 and desired hole 12 locations (e.g., CAD model, or model of the structure 12 itself created via a 3-D scan) create a projection pattern configured to aim a separate light beam onto structure 10 itself at that various locations in which holes 12 are to be drilled and fasteners 100 installed. Each light beam could have different properties (e.g., color, wavelength) for indicating the type and size of fastener 100 to be installed at each respective location. A display associated with the projection system may provide instructions to the technician, and track the location of installation tool 200 or adapter 300 throughout the installation process. Installation tool 200 or adapter 300 could even be equipped with an optical sensor configured to automatically scan the properties of the light beam being projected onto a corresponding location on structure 10 during installation of a fastener 100 at that location, and thereby associate the measured pull force with the location associated with that particular light beam. In another such embodiment, the installation tool can be integrated through an Augmented Reality Projection System such as Delta Sigma Corp's ProjectionWorks™ via a set of plugin tasks to utilize their Zigbee wireless communication link to guide data collection from the tool and to assess the quality of the installed nutplates. The resulting data will be recorded in a database, and ProjectionWorks can be then be used to project the results directly on the part in work.

In addition or alternative to associating pull force with the location of each fastener 100, in various embodiments installation tool 200 or adapter 300 may be configured to warn or prevent a technician from performing an incorrect or otherwise undesirable installation. For example, if installation tool 200 or adapter 300 is in the wrong location (e.g., near the wrong hole 12 in structure 10) or about to perform the wrong action (e.g., apply force outside of the appropriate range of forces for a successful install), software may be configured to sound a warning and/or prevent installation tool 200 or adapter 300 from functioning until it is in the correct location or configured to perform the proper action.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A fastener for retaining a bolt in a hole in a structure, comprising:
   a retainer having a bottom surface for positioning against a surface of the structure surrounding the hole;
   a bushing integrally formed with and extending from the bottom surface of the retainer, the bushing having a continuously smooth outer surface extending about an entire circumference of the bushing, being dimensioned for insertion into the hole in the structure in a neutral state, and having a wall thickness ranging from about 0.005 inches to about 0.030 inches;
   an adhesive material positioned on the bottom surface of the retainer; and
   an adhesive material positioned on the outer surface of the bushing,
   wherein the bushing is configured to be expanded within the hole to an expanded state in which the bushing has a diameter greater than in the neutral state, such expansion being adapted to: (i) enhance a bond between the adhesive material and the hole and thereby securely couple the expanded bushing within the hole of the structure via a combination of friction and the adhesive bond, (ii) anchor the retainer to the surface of the structure surrounding the hole, and (iii) impart uniform residual stress into a portion of the structure surrounding the hole.

2. The fastener of claim 1, wherein the retainer includes a nut, or a coupler for receiving a nut, for securing the bolt.

3. The fastener of claim 1, wherein the fastener is machined from a single piece of metallic material.

4. The fastener of claim 1, wherein the bushing has a substantially hollow cylindrical shape.

5. The fastener of claim 1, wherein the wall thickness of the bushing minimizes a diameter of the hole required for accommodating the bushing and the bolt inside of the hole.

6. The fastener of claim 1, wherein the bushing is configured to be expanded by about 3.5% within the hole.

7. The fastener of claim 1, further comprising a material encapsulating the adhesive material positioned on the outer surface of the bushing, the material being adapted to expose the adhesive material positioned on the outer surface of the bushing upon the application of pressure, thereby allowing the exposed adhesive material positioned on the outer surface of the bushing to form the adhesive bond with the hole.

8. The fastener of claim 1, further comprising a protective material covering the adhesive and configured to be peeled away prior to insertion into the hole in the structure.

9. The fastener of claim 1, wherein the bushing has a constant wall thickness along the entire length of the bushing.

10. A fastener system, comprising:
    a fastener for retaining a bolt in a hole in a structure, the fastener comprising:
       a retainer having a bottom surface for positioning against a surface of the structure surrounding the hole;
       a bushing integrally formed with and extending from the bottom surface of the retainer, the bushing having a continuously smooth outer surface extending about an entire circumference of the bushing, being dimensioned for insertion into the hole in the structure, and having a wall thickness ranging from about 0.005 inches to about 0.030 inches; and
       an adhesive material positioned on the outer surface of the bushing;
    a mandrel having a non-deformable construction and configured to be retracted through the fastener to expand the bushing within the hole, such expansion being adapted to: (i) enhance a bond between the adhesive material and the hole and thereby securely couple the expanded bushing within the hole of the structure via a combination of friction and the adhesive bond, (ii) anchor the retainer to the surface of the structure surrounding the hole, and (iii) impart uniform residual stress into a portion of the structure surrounding the hole.

11. The fastener system of claim 10, wherein the retainer includes a nut, or a coupler for receiving a nut, for securing the bolt.

12. The fastener system of claim 10, wherein the fastener is machined from a single piece of metallic material.

13. The fastener system of claim 10, wherein the bushing has a substantially hollow cylindrical shape.

14. The fastener system of claim 10, wherein the wall thickness of the bushing minimizes a diameter of the hole required for accommodating the bushing and the bolt inside of the hole.

15. The fastener system of claim 10, wherein the bushing is configured to be expanded by about 3.5% within the hole.

16. The fastener system of claim 10, further comprising a material encapsulating the adhesive material positioned on the outer surface of the bushing, the material being adapted to expose the adhesive material positioned on the outer surface of the bushing upon the application of pressure, thereby allowing the exposed adhesive material positioned on the outer surface of the bushing to form the adhesive bond with the hole.

17. The fastener system of claim 10, further comprising a protective material covering the adhesive material positioned on the outer surface of the bushing and configured to be peeled away prior to insertion into the hole in the structure.

18. The fastener system of claim 10, further comprising an adhesive material positioned on the bottom surface of the retainer.

19. The fastener system of claim 10, wherein the bushing has a constant wall thickness along the entire length of the bushing.

20. A method for expanding a fastener within a hole in a structure, comprising:
    placing a fastener in a hole in a structure, the fastener comprising:
       a retainer having a bottom surface for positioning against a surface of the structure surrounding the hole; and
       a bushing integrally formed with and extending from the bottom surface of the retainer, the bushing having a continuously smooth outer surface extending about an entire circumference of the bushing, being dimensioned for insertion into the hole in the structure, and having a wall thickness ranging from about 0.005 inches to about 0.030 inches; and an adhesive material positioned on the outer surface of the bushing;

retracting a mandrel through the fastener to expand the bushing within the hole to (i) enhance a bond between the adhesive material and the hole and thereby securely couple the expanded bushing within the hole of the structure via a combination of friction and the adhesive bond, (ii) anchor the retainer to the surface of the structure surrounding the hole, and (iii) impart uniform residual stress into a portion of the structure surrounding the hole.

21. The fastener system of claim 20, wherein the retainer includes a nut, or a coupler for receiving a nut, for securing the bolt.

22. The method of claim 20, wherein the fastener is machined from a single piece of metallic material.

23. The method of claim 20, wherein the bushing has a substantially hollow cylindrical shape.

24. The method of claim 20, wherein the wall thickness of the bushing minimizes a diameter of the hole required for accommodating the bushing and the bolt inside of the hole.

25. The method of claim 20, wherein the bushing is configured to be expanded by about 3.5% within the hole.

26. The method of claim 20, wherein the fastener further comprises a material encapsulating the adhesive material positioned on the outer surface of the bushing, the material being adapted to expose the adhesive material positioned on the outer surface of the bushing upon the application of pressure, thereby allowing the exposed adhesive material positioned on the outer surface of the bushing to form the adhesive bond with the hole.

27. The method of claim 20, wherein the fastener further comprises a protective material covering the adhesive material positioned on the outer surface of the bushing and configured to be peeled away prior to insertion into the hole in the structure.

28. The method of claim 20, wherein the fastener further comprises an adhesive material positioned on the bottom surface of the retainer.

29. The method of claim 20, wherein the bushing has a constant wall thickness along the entire length of the bushing.

30. A fastener for retaining a bolt in a hole in a structure, comprising:

a retainer having a bottom surface for positioning against a surface of the structure surrounding the hole;

a bushing integrally formed with and extending from the bottom surface of the retainer, the bushing having a continuously smooth outer surface extending about an entire circumference of the bushing, being dimensioned for insertion into the hole in the structure in a neutral state, and having a wall thickness ranging from about 0.005 inches to about 0.030 inches;

an adhesive material positioned on the outer surface of the bushing; and a protective material covering the adhesive and configured to be peeled away prior to insertion into the hole in the structure, wherein the bushing is configured to be expanded within the hole to an expanded state in which the bushing has a diameter greater than in the neutral state, such expansion being adapted to: (i) enhance a bond between the adhesive material and the hole and thereby securely couple the expanded bushing within the hole of the structure via a combination of friction and the adhesive bond, (ii) anchor the retainer to the surface of the structure surrounding the hole, and (iii) impart uniform residual stress into a portion of the structure surrounding the hole.

31. The fastener of claim 30, wherein the retainer includes a nut, or a coupler for receiving a nut, for securing the bolt.

32. The fastener of claim 30, wherein the fastener is machined from a single piece of metallic material.

33. The fastener of claim 30, wherein the bushing has a substantially hollow cylindrical shape.

34. The fastener of claim 30, wherein the wall thickness of the bushing minimizes a diameter of the hole required for accommodating the bushing and the bolt inside of the hole.

35. The fastener of claim 30, wherein the bushing is configured to be expanded by about 3.5% within the hole.

36. The fastener of claim 30, further comprising an adhesive material positioned on the bottom surface of the retainer.

37. The fastener of claim 30, wherein the bushing has a constant wall thickness along the entire length of the bushing.

* * * * *